Figures 1, 2:
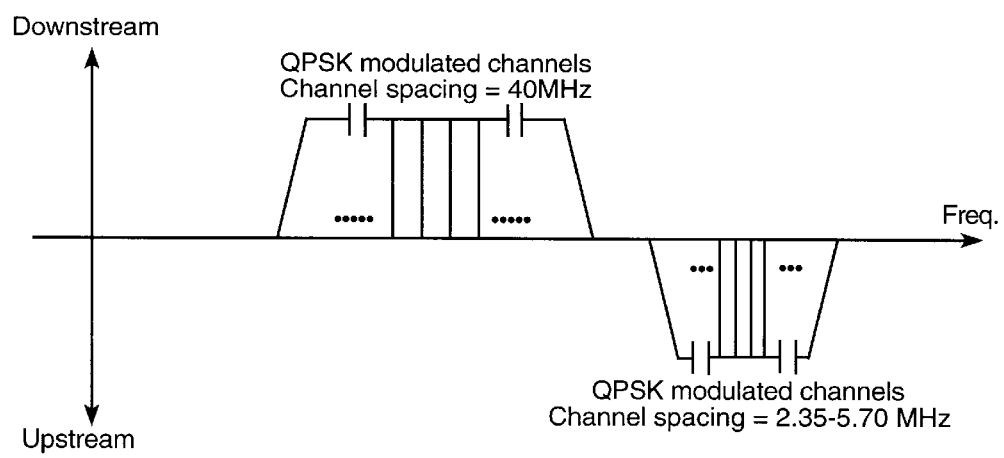

United States Patent [19]
Evans et al.

[11] Patent Number: 5,886,989
[45] Date of Patent: Mar. 23, 1999

[54] SYSTEM FOR THE DELIVERY OF WIRELESS BROADBAND INTEGRATED SERVICES DIGITAL NETWORK (ISDN) USING ASYNCHRONOUS TRANSFER MODE (ATM)

[75] Inventors: Allan Evans, Sunnyvale; April Hunter, Los Altos; Charles VanBlaricom, Cupertino; Joel Williams, San Jose; Aki Shohara, Sunnyvale, all of Calif.

[73] Assignee: Stanford Telecommunications, Inc., Sunnyvale, Calif.

[21] Appl. No.: 662,772

[22] Filed: Jun. 10, 1996

Related U.S. Application Data

[63] Continuation-in-part of Ser. No. 568,600, Dec. 5, 1995, Pat. No. 5,751,702.

[51] Int. Cl.[6] .................................................. H04B 7/212
[52] U.S. Cl. ........................... 370/347; 370/346; 370/350
[58] Field of Search ..................................... 370/347, 329, 370/331, 337, 321, 350, 395, 346, 348, 410, 338, 339, 409, 449; 455/422, 522; 340/825.08

[56] References Cited

U.S. PATENT DOCUMENTS

| | | | |
|---|---|---|---|
| 5,012,469 | 4/1991 | Sardanu | 370/321 |
| 5,371,734 | 12/1994 | Fischer | 340/825.47 |
| 5,633,868 | 5/1997 | Baldwin et al. | 379/60 |
| 5,638,371 | 6/1997 | Raychaudhuri et al. | 370/347 |

*Primary Examiner*—Ajit Patel
*Attorney, Agent, or Firm*—Jim Zegeer, Esq.

[57] ABSTRACT

A system for the delivery of wireless broadband integrated services digital network (ISDN) using asynchronous transfer mode (ATM).

5 Claims, 13 Drawing Sheets

| OSI Reference Model | User Plane | Control Plane | Management Plane | Layer Management |
|---|---|---|---|---|
| Higher Layer | | MAC Manager | RF Link Manager | |
| Data Link Layer | ATM Adaptation Layer<br>ATM Layer<br>MAC Sublayer | | | |
| Physical Layer | Transmission Convergence Sublayer<br>Physical Medium Dependent Sublayer | | | |

$\overline{\text{Sync 1}}$ - not randomized complemented sync byte

Sync n - not randomized sync byte. n=2...8

SYSTEM FOR THE DELIVERY OF WIRELESS BROADBAND INTEGRATED SERVICES DIGITAL NETWORK (ISDN) USING ASYNCHRONOUS TRANSFER MODE (ATM)

1. REFERENCE TO RELATED APPLICATION

This application is a continuation-in-part of application Ser. No. 08/568,600 filed Dec. 5, 1995 now U.S. Pat. No. 5,751,702.

2. BACKGROUND OF THE INVENTION

The recent allocation of frequencies by the FCC at 2.5 GHz and 28 GHz has enabled the delivery of broadband-ISDN services to residential and commercial users through wireless means. Broadband-ISDN typically uses ATM as the link layer of the network protocol. ATM is a switch-oriented link protocol where each user has a dedicated connection to the switch and the switch manages bandwidth contention by multiple users by queues input cells until they can be delivered to the appropriate output. In a wireless point to multipoint system, the analog of the switch resides in a base station and the link to the switch is a shared medium by all users whose access to that medium must be controlled. Therefore, for wireless point to multipoint systems there is the additional need for medium access control which is not required in ordinary ATM networks.

The medium access control requirements for wireless point to multipoint systems where the users are stationary are unique compared to other wireless networks such as wireless local area networks (LANs) as specified by the IEEE 802.11 standard. A wireless point to multipoint system can take advantage of the stationary nature of users enabling the use of highly directional antennas at the user stations. However, the base station will still employ broad beam antennas and will thus have multiple user transmissions received simultaneously. Medium access control will be necessary to ensure that mutual interference by multiple user transmissions impinging on the base station antenna is eliminated.

There are numerous MAC protocols currently in use by both wired and wireless standard. In Ethernet, where the cabling is a shared medium, carrier-sense multiple access is employed which is essentially a listen before talk approach. In wireless LANs, such as that specified by the IEEE 802.11 standard, medium access control is also managed through carrier-sense multiple access. This is possible because portable user terminals will each typically have an omnidirectional antenna so that each user terminal can receive a transmission from other users and ascertain whether the frequency channel is available. This is not possible with wireless point to multipoint systems where stationary users employ directional antennas as they cannot receive transmission from other users.

An additional complication in wide area wireless point to multipoint systems is that the two-way range differential between users close to the base station and those distant to the base station can be much larger than modulation symbol.

The objection of the invention is to provide a networking system which provides bandwidth to users on an on-demand basis, which controls access by users to the shared wireless medium, which is bandwidth efficient, and which can be implemented with the minimum of hardware cost.

3.1 SUMMARY OF THE INVENTION

A networking protocol for wireless point (base station) to multipoint (user) networks where the users are stationary which utilizes time-division multiplexing in the direction of the base station to the user, heretofore called the downstream direction, and time-division multiple access in the direction of the user to the base station, heretofore called the upstream direction, where medium access control actively assigns time slots in the upstream direction to accommodate varying demands for bandwidth by multiple users, where upstream frame timing is synchronized to the downstream frame timing, where time slots carry individual ATM cells, where the first time slot of the downstream frame carries a frame start ATM cell, where upstream time slot synchronization is maintained to within ±2 modulation symbols through timing control from the base station to the user, where random access time slots are used for control plane requests by users entering the network and users are on a polling response time slot.

3.2 SUMMARY OF SPECIFIC EMBODIMENTS

A networking protocol for wireless point (base station) to multipoint (user) networks with stationary users utilizing high gain directional antennas where:

1. Means for transmission convergence layer is provided through
   a) Time-division multiplexing is performed on an ATM cell basis in the direction of the base station to the user, heretofore called the downstream direction;
   b) Time-division access on an ATM cell basis is used in the direction of the user to the base station, heretofore called the upstream direction;
   c) Upstream frame timing is synchronized to the downstream frame timing, where the first time slot of the downstream frame carries a Frame Start service data unit which is an ATM Adaptation Layer 5 PDU identified by a unique reserved VPI VCI of 0xFF 0xFFFF;
   d) Frame periods in both the upstream and downstream directions are approximately but not greater than six milliseconds in length to allow delivery of voice traffic with minimum latency.

2. Means for physical medium dependent layer where
   a) The downstream is continuous-carrier with $\alpha=0.20$ root-raised cosine filtering with QPSK or alternately 16 QAM or 64 QAM modulation, using concatenated forward error correction coding consisting of a (204.188.t-8) Reed-Solomon over GF(256);
   b) The upstream is burst-mode with $\alpha=0.30$ root raised cosine filtering, with QPSK or alternately 16 QAM modulation, using forward error correction of a (68.53.t-5) Reed-Solomon code over GF (256);
   c) Time slots in the upstream direction have four preamble bytes, one ATM cell with 10 bytes of Reed Solomon overhead, and a one byte guard time.

3. Means for medium access control functions is provided through
   a) In-band signaling through ATM cells with reserved VPI/VCIs so that the requirements for acquisition, demodulation, and forward error correction are uniform across the data, control, and management planes of the network protocol;
   b) Transmission convergence layer medium access control which dynamically assigns time slots in the upstream direction to accommodate varying demands for bandwidth by multiple users;
   c) Contiguous time slots in the upstream frame are used for entry into the network by users whose two-way range timing has not been resolved to avoid mutual interference, where users entering the network remain on the net entry time slots until their timing is aligned;

d) Session requests are performed on a contention basis through contention time slots;

e) Single cell available bit rate (ABR) service data units (SDUs) can be sent on contention time slots in the upstream direction with acknowledgment coming from the base station in the downstream frame start PDU;

f) Contention acknowledgment is sent on the downstream frame to perform stabilization of the retransmission probabilities to avoid collisions becoming severe;

g) Control plane acknowledgments of service requests and time slots reservations are made in the payload of the frame start PDU in the downstream frame.

4. Means for management plane functions are provided through a) In-band signaling through ATM cells with reserved VPI/VCIs so that the requirements for acquisition, demodulation, and forward error correction are uniform across the data, control, and management planes of the network protocol;

b) Polling users by the base station for status, power, frequency, and timing control, with users responding on dedicated time slots in the upstream frame;

c) Carrying management plane polling requests in the payload of the frame start PDU in the downstream frame carries;

d) Upstream time slot synchronization is maintained to within +2 modulation symbols through timing control from the base station to the user and through slaving the user transmit symbol clock to its received symbol clock in the transmission convergence layer;

e) Upstream power control is employed to ensure adequate received signal strength at the base station while minimizing adjacent cell interference.

5. Hardware and software means for implementing above claims in the base station including:

a) means for routing of in-band signaling ATM cells by the ATM switching device to and from the central processing unit;

b) means for measuring timing offsets by subscribers through counting periods of the reference symbol clock from a master frame epoch to the detection of the Barker sequence of the received transmission from the user;

c) means for measuring received signal level via bit error rate estimation for closed loop power control of the user transmitter.

6. Hardware and software means for implementing above claims in the user equipment including:

a) means for routing in-band signaling ATM cells to and from the ATM switching or segmentation and reassembly device to the user equipment central processing unit;

b) adjusting transmitter power based on received power level and power control commands via in-band signaling ATM cells from the base station;

c) means for slaving the transmit symbol clock reference to the received symbol clock reference;

d) means for adjusting the transmit symbol clock timing to minimize interference to other users.

7. Means for providing local area network (LAN) functionality through a proxy LAN Emulation client residing in the base station equipment which performs the necessary signaling and address resolution for the user equipment.

3.3. DESCRIPTION OF THE DRAWINGS

Figure 3:
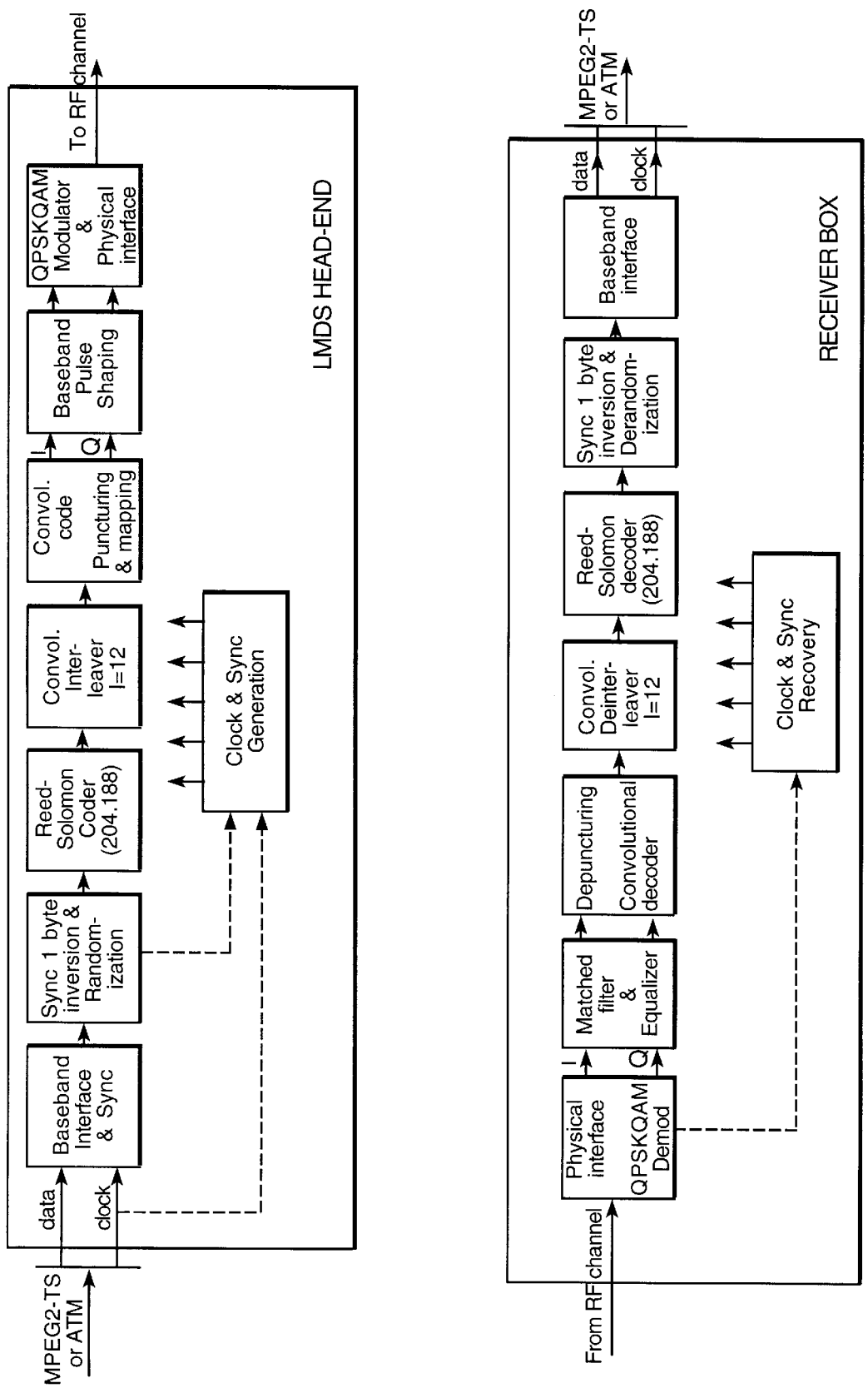
Figure 5:
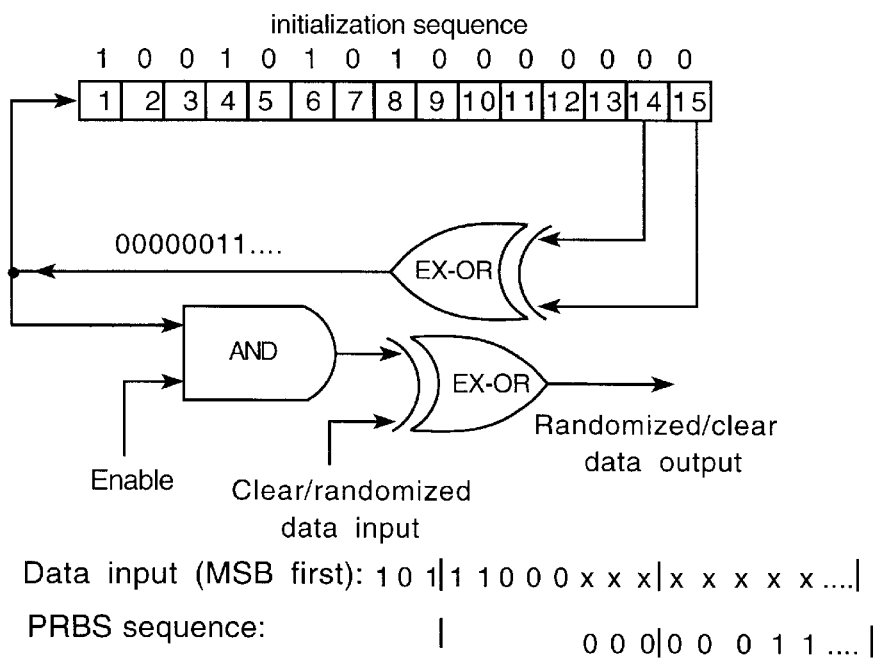
Figure 6:
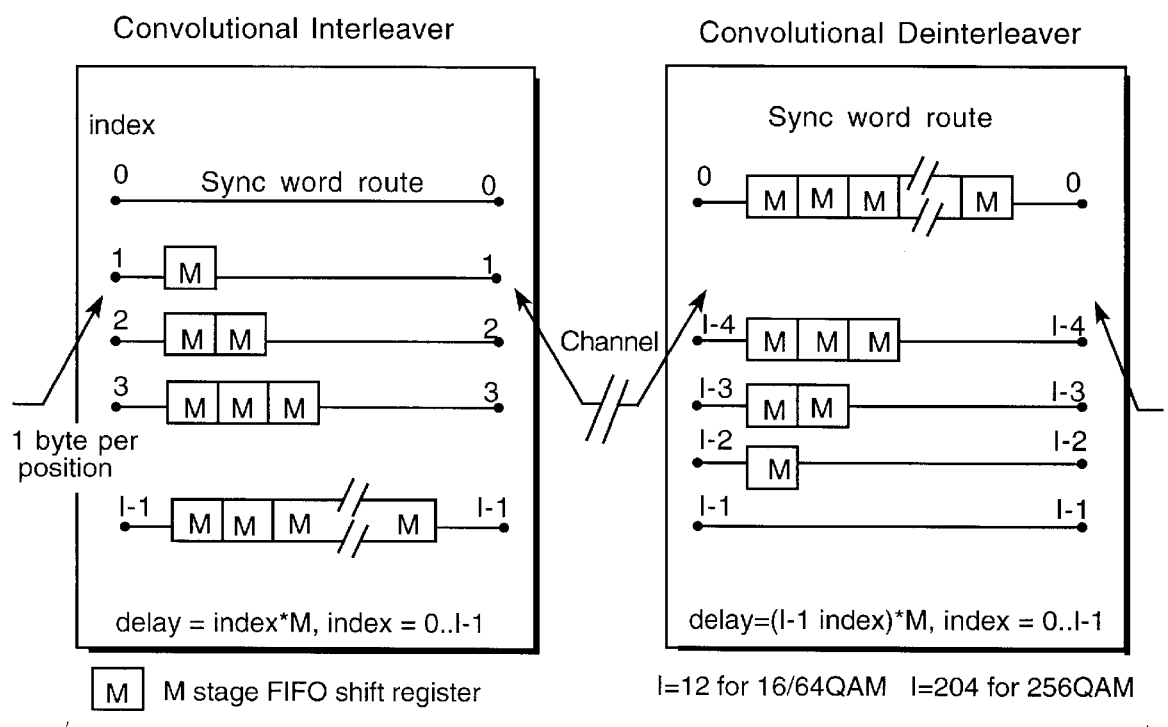
Figure 7:
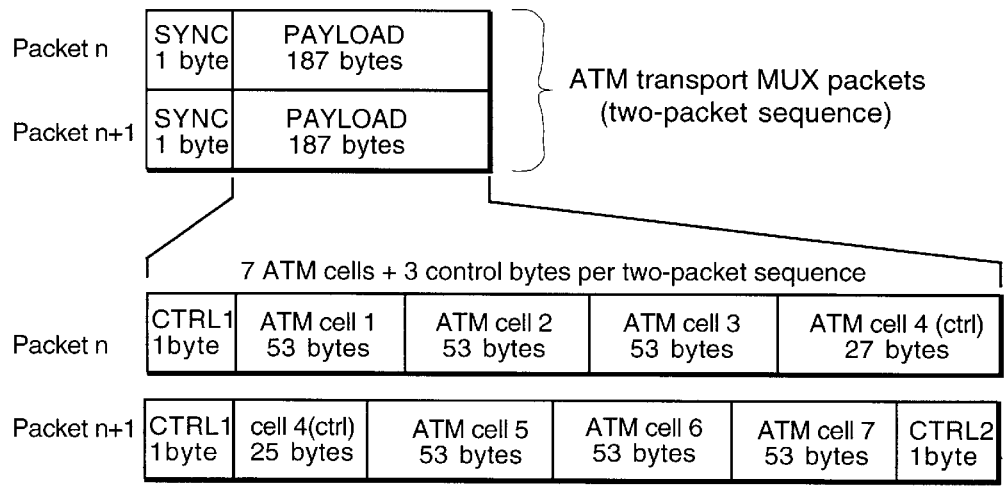
Figure 8:
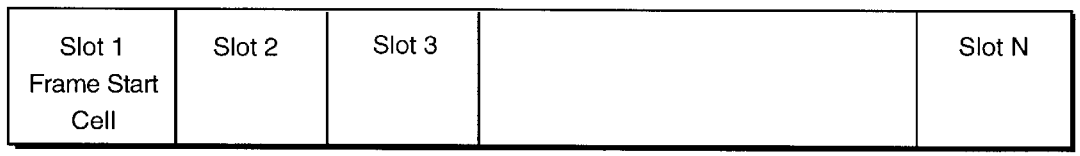
Figure 9:
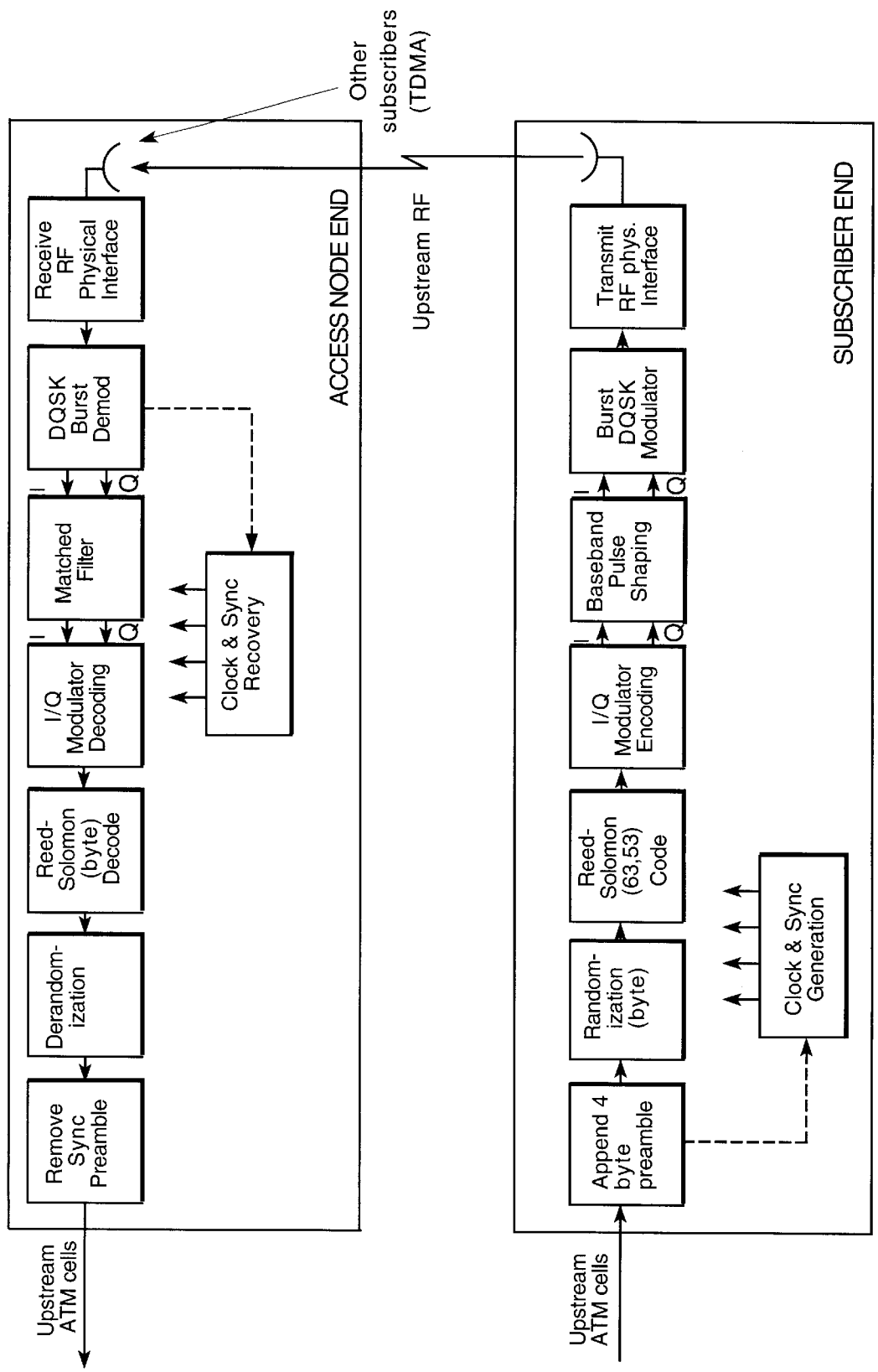
Figure 10:
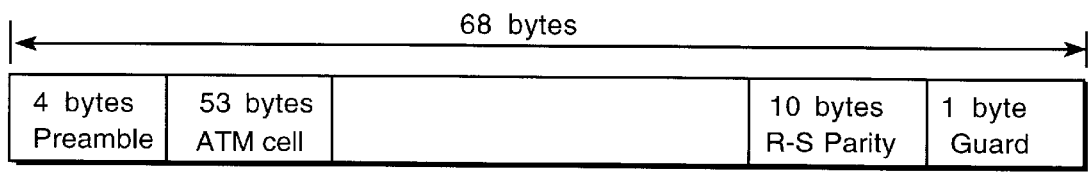
Figure 11:
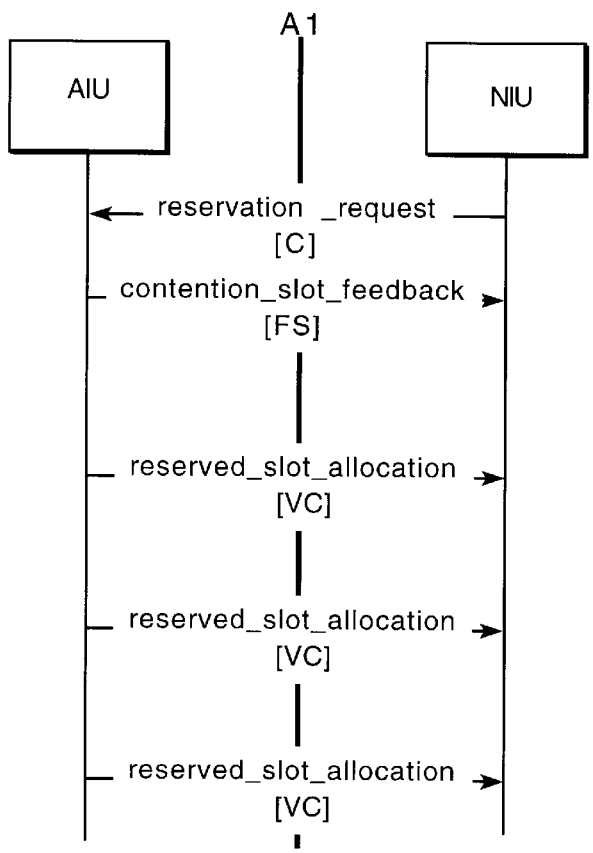
Figure 12:
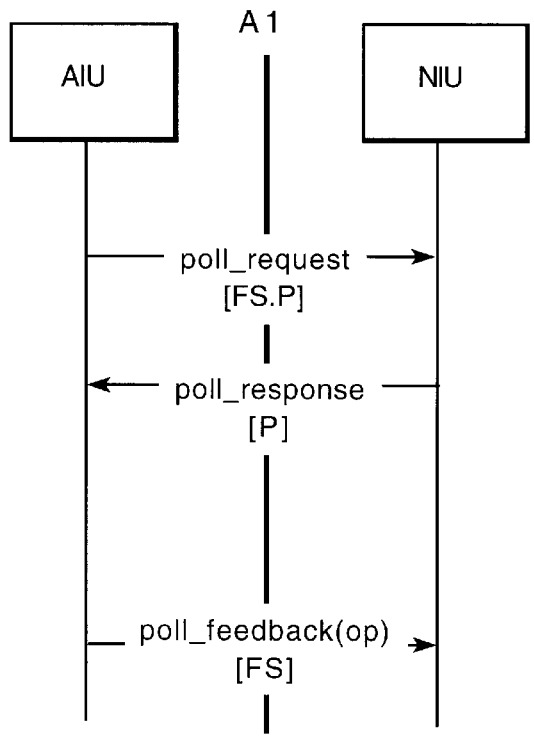
Figure 13:
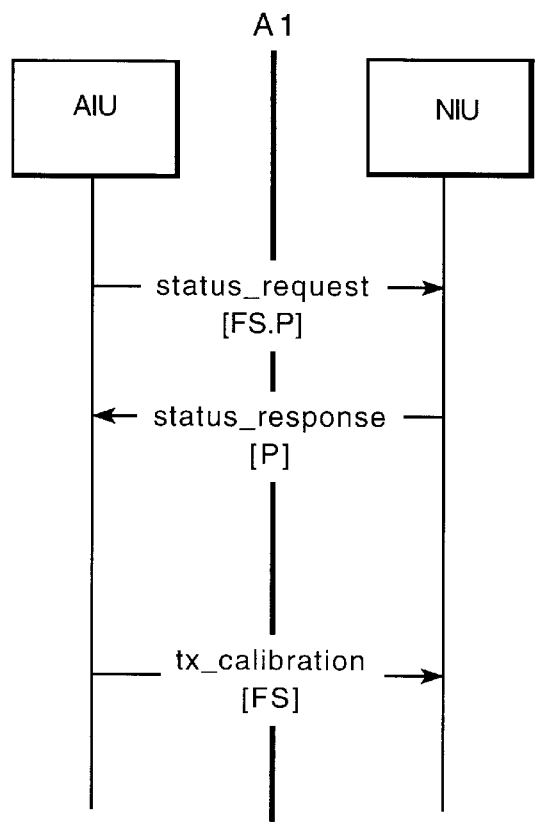
Figure 14:
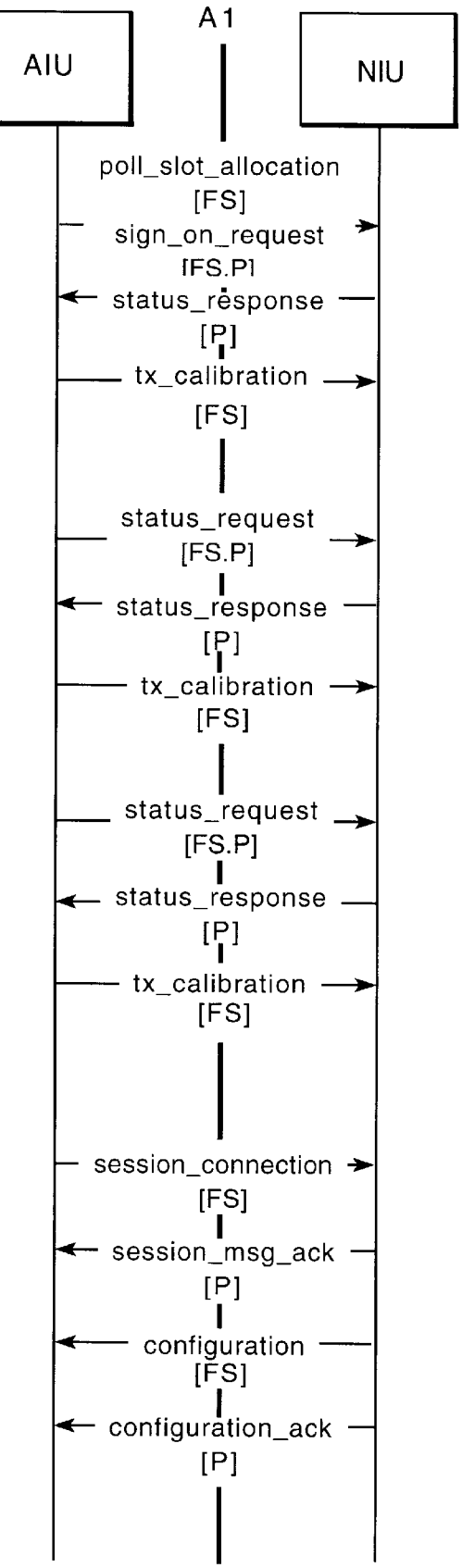
Figure 15:
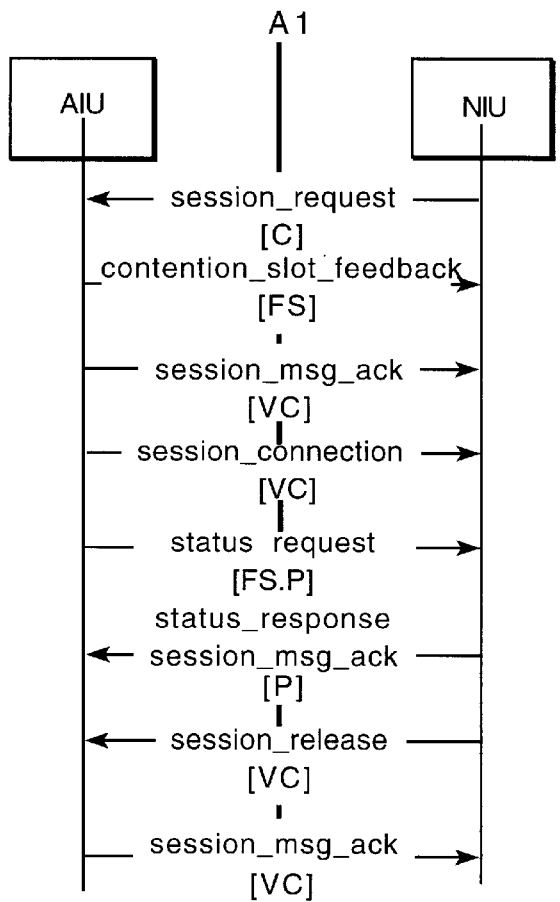
Figure 16:
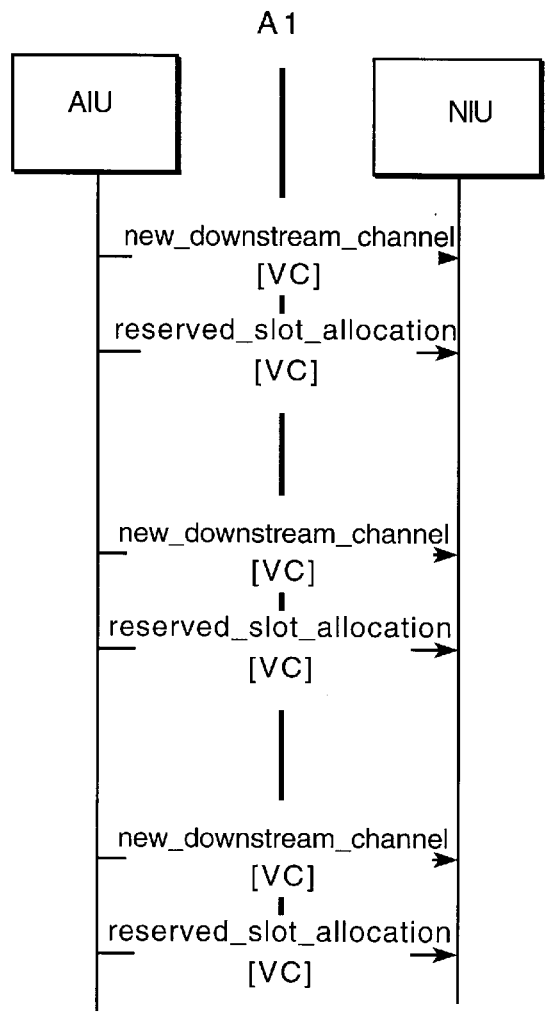
Figure 17:
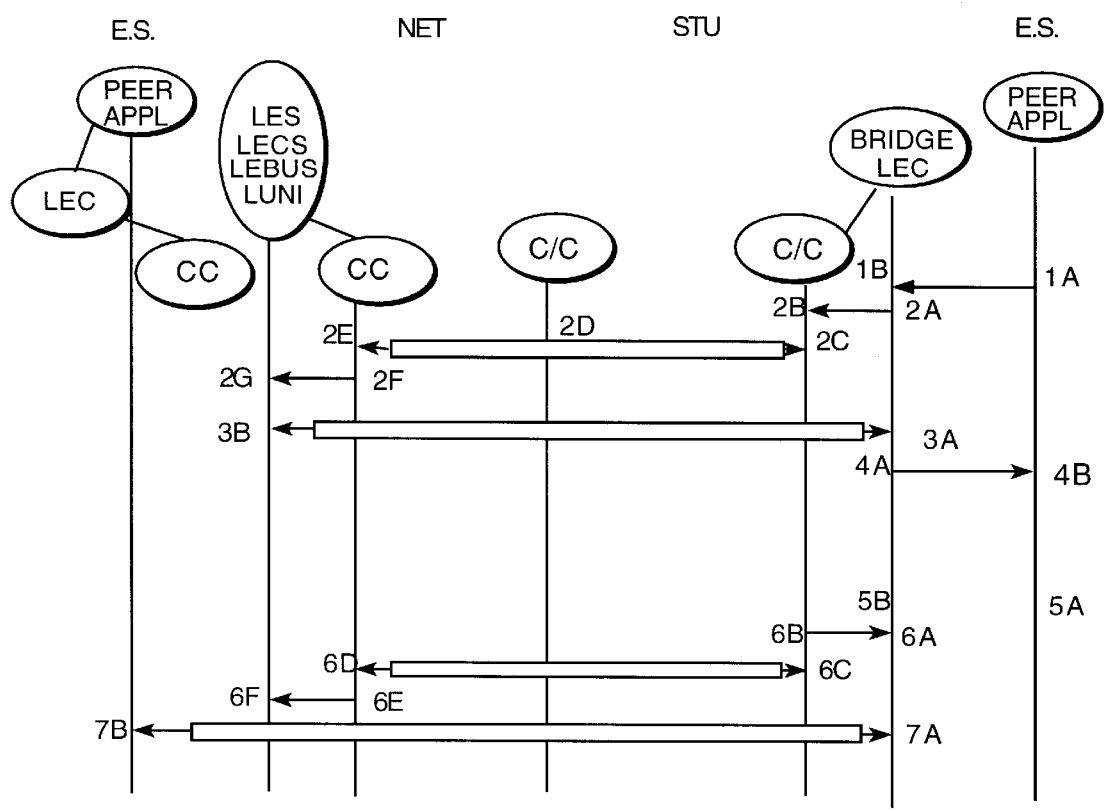
Figure 18:
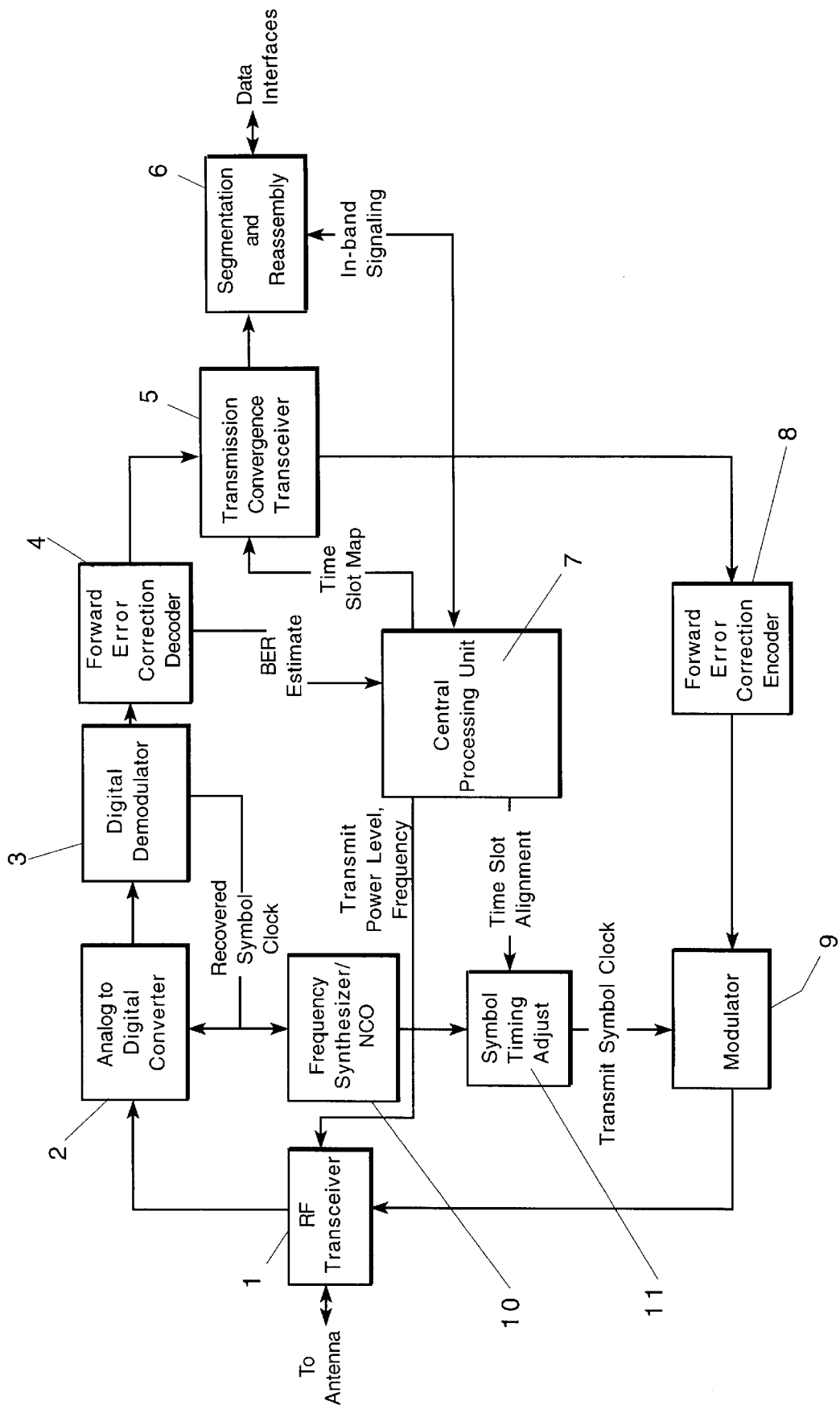

The above and other objects, advantages and features of the invention will become more apparent when considered with the following specification and accompanying drawings wherein:

FIG. 1 shows the protocol stack for the invention according to the convention of the OSI Reference Model;

FIG. 2—Conceptual Illustration of OMDS Spectrum Channelization;

FIG. 3—Conceptual block diagram of elements at the LMDS head-end and receiving site;

FIG. 4—Framing structure when carrying MPEG2-TS;

FIG. 5—Randomizer logic diagram;

FIG. 6—Conceptual diagram of the convolutional interleaver and deinterleaver;

FIG. 7—Mapping of ATM Cells onto Transport Packets;

FIG. 8—Downstream Frame Structure;

FIG. 9—Upstream Data Flow;

FIG. 10—Upstream Time Slot Structure;

FIG. 11—Upstream Time Slow Allocation;

FIG. 12—Polling Handshake;

FIG. 13—Polling Handshake—Upstream Signal Calibration;

FIG. 14—Network Entry;

FIG. 15—Session Connections;

FIG. 16—Sector Load Balance;

FIG. 17—Shared Media Connectivity to End Station—LANE in Network;

FIG. 18—Hardware Architecture for User Equipment; and

Figure 19:
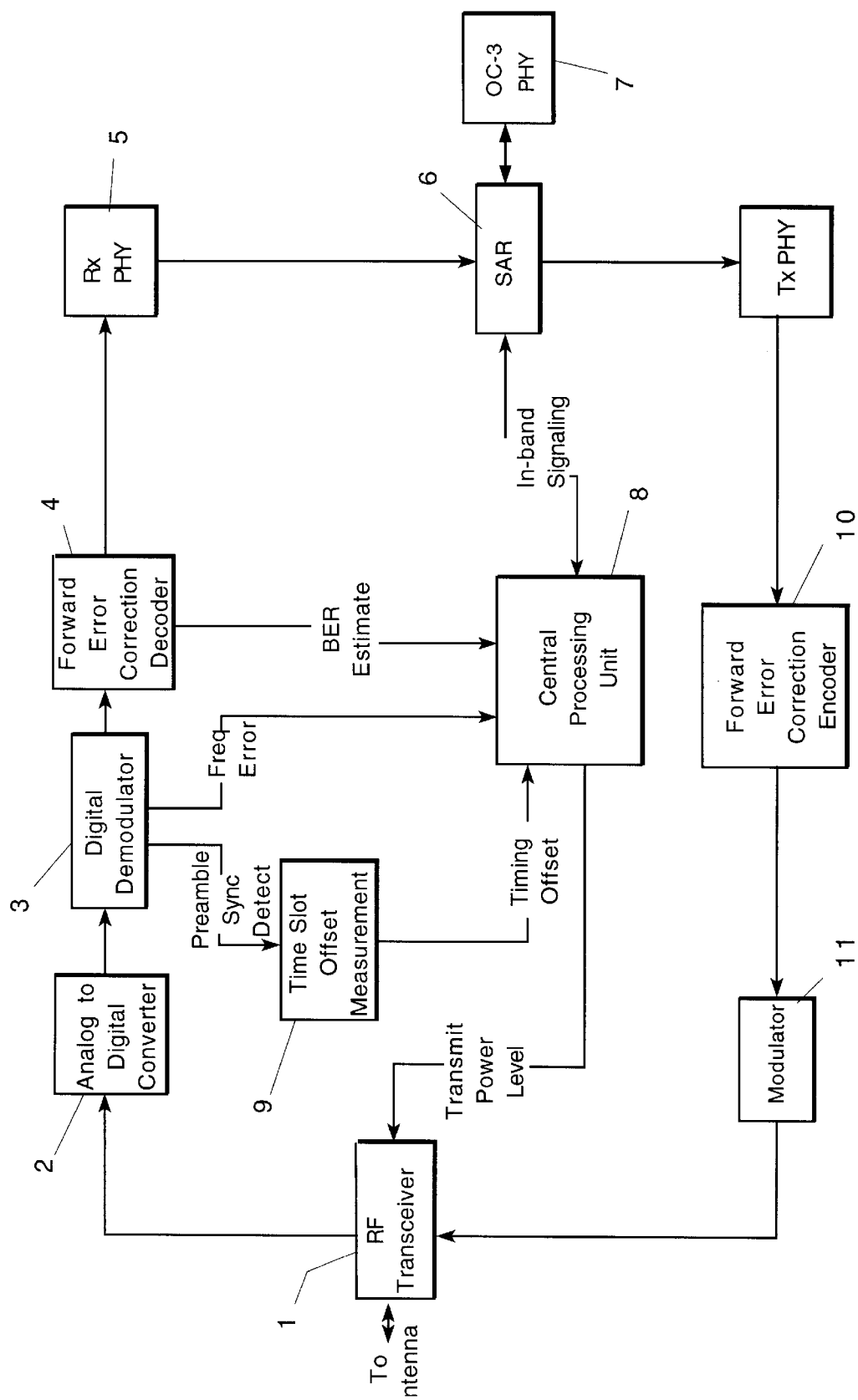

FIG. 19—Hardware Architecture for Base Station Equipment.

4. DESCRIPTION OF THE SPECIFIC EMBODIMENTS

It is well known that asynchronous transfer mode is the candidate network link protocol for broadband integrated services digital network (B-ISDN) which is typically defined as bit rates in excess of that of the primary rate interface ISDN (PRI-ISDN) of 1.544 Mbps. Physical layer standards have been developed or are being developed for using ATM over synchronous optical network (SONET) at rates of 155 and 622 Mbps. over category 3 twisted pair at 25 Mbps. and over category 5 twisted pair at 45 Mbps. and 100 Mbps. In each of these cases, however, the network topology is switch-oriented where each user has a dedicated connection to an input port of the switch, and the switch buffers input cells until they can be routed to an output port of the switch. This is a classical star configuration.

In a wireless point to multipoint system, where the users each employ a narrowbeam antenna, and the switch resides in a centrally-located base station which employs a broad beam antenna, in which multiple users lie in its beam, the wireless medium becomes a shared medium. While the point to multipoint nature of the systems appears to be a star topology, because the wireless medium is shared, it is actually a bus or ring configuration. Hence, a medium access control protocol needs to be defined.

The network protocol stack is as shown in FIG. 1 and comprises the physical layer of the OSI Reference Model. Within the physical layer there is the physical medium dependent layer which involves the modulation, forward error correction, and filtering of the signal that is transmitted over the wireless medium. The transmission convergence layer comprises time-multiple access, the frame structure, and the time-slot structure within each frame.

The control plane functions at the transmission convergence layer include those functions necessary for controlling access to the wireless medium through assignment of time slots. This function must interface to higher level control plane functions such as the ITU Q 2931 signaling standard, the ATM Forum User Network Interface, and LAN Emulation clients.

The management plane functions at the transmission convergence layer involve timing control to minimize guard band times between time slots. At the physical layer, the management functions involve controlling the user transmitter power to ensure an adequate received signal level at the base station but not too strong as to cause adjacent cell interference, where cell refers to a cell in a cellular distribution system, not an ATM cell. Additionally, the management plane functions include controlling the user's transmit frequency so that it does not interfere with users on adjacent frequency channels, which is described in detail in a separate patent application.

This Physical Layer Interface supports bidirectional transmission over millimeter radio wave. This Interface is a point-to-multipoint TDM broadcast from Access Node to STB, and point-to-point upstream TDMA link from STB to Access Node. This Physical Layer Interface specifies the complete physical layer structure for the bidirectional carriage of S1, S2, S3, S4, and S5 information.

The spectrum allocations for downstream and upstream transmissions depend on the LMDS region and this Physical Interface specification applies for the case of frequency division duplexing as illustrated by the example in FIG. 2. The allocated downstream spectrum shall be partitioned into frequency channels of specified spacing, and the downstream data shall have the specified TDM framing structure, i.e., a contiguous stream of data packets that are encoded carried on a continuous carrier RF waveform by QPSK modulation.

The allocated upstream spectrum shall be partitioned into frequency channels of specified spacing, and the channels shall have the specified TDMA framing structure. The upstream transmission from the STB shall be contained in RF packets, i.e., bursts of data transmissions, where the timing of packet transmissions defined by the slots of the TDMA frame. The upstream TDMA frame and downstream TDM frame shall have equal frame lengths of 5.8752 milliseconds. At the Access Node, the upstream frame epochs have a configured delay relative to the downstream frame start epochs. All STBs shall synchronize their upstream packet transmission times so that packets arrive at the Access Node in assigned slots to within a specified accuracy. The requisite upstream synchronization accuracy shall be achieved with the aid of Access Node feedback of measured synchronization error to STBs.

The parts of the network protocol stack as shown in FIG. 1 are described. Consistent with ATM Forum and ITU standards, the data link layer conforms to that of ATM with the addition of a medium access control (MAC) sublayer whose function is to isolate the point to point asynchronous transfer mode layer from the synchronous and multipoint to point physical layer. The MAC sublayer provides unacknowledged and acknowledged transmission of ATM cells to the ATM layer depending on whether the transmission was reservation based or contention based. Contention based transmissions are limited to control plane messages and to single cell service data units (SDUs) on the user plane. All other user plane transmissions are sent on reserved time slots.

The physical layer is comprised of a transmission convergence (TC) sublayer and a physical medium dependent sublayer. The transmission convergence sublayer comprises time-multiple access, the frame structure, and the time slot structure within each frame. The transmission convergence provides for contention, reservation, and polling response transmissions to the MAC sublayer. The physical medium dependent sublayer pertains to modulation, forward error correction, and filtering of signals transmitted over the wireless medium. The Transmission Convergence Sublayer and Physical Dependent Sublayer are described in 4.1 for the downstream, and 4.2 for the upstream.

The higher layer control plane layers such as Q2931 which are point to point protocols are isolated from the point to multipoint physical layer through the MAC Manager. The MAC Manager resides between the data link layer and the higher layer control plane functions and performs VPI/VCI translation of well known virtual connections, such as 0/5 for signaling to a unique VPI/VCI for each STB. The MAC Manager also parses the Frame Start PDU for contention acknowledgments and communicates these to the TC sublayer through a Layer Management function.

The RF Link Manager resides above the ATM layer and is responsible for responding to polls from the base station for maintenance of the RF Link. The RF Link Manager access the STB hardware to read metrics for frequency and offset power offset and formulates a message which is sent to the base station on a polling response time slot.

4.1 DOWNSTREAM PHYSICAL LAYER
4.1.1 PHYSICAL MEDIUM DEPENDENT SUBLAYER

To leverage existing physical layer ASIC technology, the coding and modulation of the downstream carrier waveform shall be made to be compatible with Digital Video Broadcasting by Satellite standard. This standard is for the transmission of a packetized digital video corresponding to the Motion Picture Experts Group Standard 2 (MPEG-2) using 188 byte packets. The MPEG-TS is defined in [ISO,IEC 13818-11]. The Transport Stream for MPEG2 data is comprised of packets having 188 bytes, with one byte for synchronization purposes, three bytes of header containing service identification, scrambling and control information, followed by 184 bytes of MPEG2 or auxiliary data. The framing organization shall be based on the MPEG2 transport packet structure. The encoding and decoding functions for the DVB are summarized in the block diagram in FIG. 2.

4.1.1.1 SUMMARY OF DVB ENCODING AND DECODING PROCESS 4.1.1.1.1 Baseband Interfacing and Sync This unit shall adapt the data structure to the format of the signal source. The framing structure shall be in accordance with MPEG-2 Transport Stream (including sync bytes).

4.1.1.1.2 Sync 1 Inversion and Randomization

This unit shall invert the Sync 1 byte according to the MPEG-2 framing structure, and randomizes the data stream for spectrum shaping purposes.

4.1.1.1.3 Reed-Solomon (RS) Coder

This unit shall apply a shortened Reed-Solomon (RS) code to each randomized transport packet to generate an error-protected packet. This code shall also be applied to the Sync byte itself.

4.1.1.1.4 Convolutional Interleaver

This unit shall perform a convolutional interleaving of the error-protected packets with I=12/M=17. The periodicity of the sync bytes shall remain unchanged.

4.1.1.1.5 Convolutional Coder

This unit shall perform the convolutional code with rates ½, ⅔, ¾, ⅚, and ⅞ obtained by puncturing the code with rate 1:2. At present this block is applied to QPSK only.

4.1.1.1.6 Baseband Shaping

This unit performs mapping from differentially encoded multiples to I and Q signals and a square-root raised cosine filtering of the I and Q signals prior to QPSK modulation. The roll-off factor shall be a=0.35 in accordance with DVB. The channelization shall be either 20 MHz or 40 MHz.

4.1.1.1.7 Modulation and Physical Interface

This unit performs QPSK modulation (Grade A) or 16-QAM (Grade B). It is followed by interfacing the QPSK 16-QAM modulated signal to the Intermediate Frequency (IF) channel.

4.1.1.1.8 LMDS Receiver

A System receiver shall perform the inverse signal processing, as described for the modulation process above, in order to recover the baseband signal.

4.1.1.2 CHANNEL CODING

In order to minimize power amplifier output requirements at the subscriber end, concatenated coding of an outer Reed Solomon code and an inner convolutional code shall be employed. A convolutional interleaver shall be employed between the Reed-Solomon encoder and convolutional encoder in order to disperse byte error bursts at the output of the convolutional decoder.

4.1.1.2.1 Randomization for Spectrum Shaping

Randomization shall be employed to minimize the possibility of transmission of an unmodulated carrier and to ensure adequate numbers of bit transitions to support clock recovery.

The stream of uncoded downstream packets (FIG. 5a), excluding sync bytes, shall be randomized by modulo-2 addition of the data with the output of the pseudo random binary stream (PBRS) generator, as illustrated in FIG. 5. The PBRS shall be initialized at each inverted sync byte by the sequence 100101010000000 in the manner depicted in the figure. The sync byte (hex 4711) shall be inverted (hex B811) every eight packets, starting at the beginning of the frame.

The generator polynomal for the PRBS shall be $$1 \cdot X^{11} \cdot X^{15}$$

Following initialization, the first PRBS generator output bit shall be added to the first bit following the inverted sync bit. Over subsequent sync bytes, the PBRS generator shall continue to step its internal shift register state but the PBRS output addition to the sync byte bits shall be disabled. Thus, the period of the PRBS sequence shall be 1504 bytes, as illustrated in FIG. 5b.

4.1.1.2.2 Reed Solomon Coding

Following the energy dispersal randomization process, systematic shortened Reed-Solomon encoding shall be performed on each randomized MPEG-2 transport packet, with T=8. This means that 8 erroneous bytes per transport packet can be corrected. This process adds 16 parity bytes to the MPEG2 transport packet to gave a codeword (204.188). RS coding shall also be applied to the packet sync byte, either non-inverted (i.e. 47 hex) or inverted (i.e. 138 hex). The Reed-Solomon code shall have the following generator polynoms:

Code Generator Polynomial:

$$g(X)=(X+\mu^0)(X+\mu^1)(X+\mu^2)\ldots(X+\mu^{15})$$

where $\mu=02$ hex

Field Generator Polynomial:

$$p(X)=X^8=X^4+X^3+X^2+1$$

The shortened Reed-Solomon code shall be implemented by appending 51 bytes, all set to zero, before the information bytes at the input of a (255.239) encoder, after the coding procedure these bytes are discarded.

4.1.1.2.3 Convolutional Interleaving

Figure 4A:
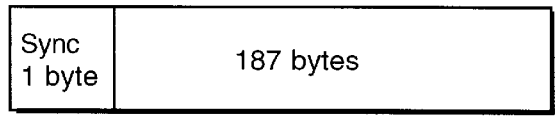
Figure 4B:
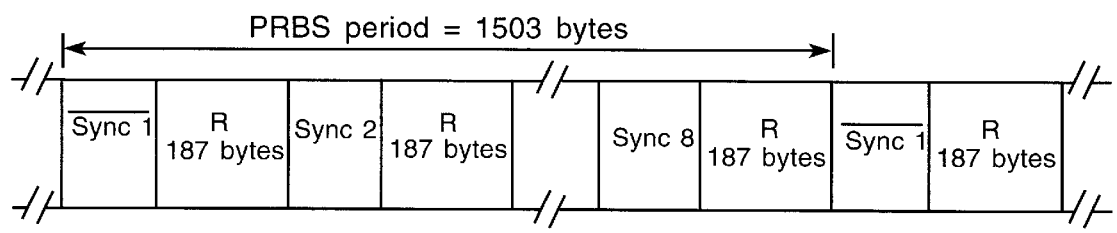
Figure 4C:
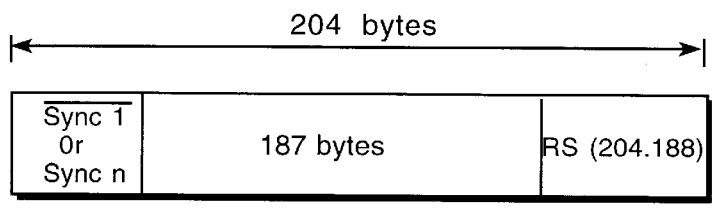
Figure 4D:
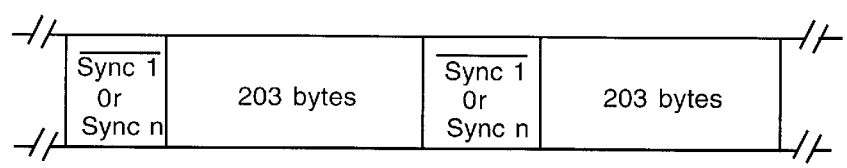

Convolutional interleaving shall be applied to the error protected packets (see FIG. 4(c)). This results is an interleaved frame (see FIG. 4(d)).

The convolutional interleaving process shall be based on the Forney approach, which is compatible with the Ramsey type III approach, with I=12. The Interleaved frame shall be composed of overlapping error protected packets and shall be delimited by MPEG2 sync bytes (preserving the periodicity of 204 bytes).

The interleaver is composed of 1 branches, cyclically connected to the input byte-stream by the input switch. Each branch shall be a First In First Out (FIFO) shift register, with depth (M) cells (where M=N/I, N=204=error protected frame length. 1=interleaving depth, j=branch index). The cells of the FIFO shall contain 1 byte, and the input and output switches shall be synchronized.

For synchronization purposes, the sync bytes and the inverted sync bytes shall be always routed into the branch "0" of the interleaver (corresponding to a null delay).

The deinterleaver is similar, in principle, to the interleaver, but the branch indexes are reversed i.e., j=0 corresponds to the largest delay). The deinterleaver synchronization is achieved by routing the first recognized sync byte into the "0" branch.

4.1.1.2.4 Convolutional Coding

The convolutional code for QPSK modulation shall be the rate 7:8 code obtained by puncturing of the rate 1:2 constraint length K=7 code having the following generator vectors g, and puncturing patterns P (0 denotes punctured (deleted) b$\mu$.

TABLE 1

| | | | Convalutional Code Puncture Patterns | | | | | | | | | |
|---|---|---|---|---|---|---|---|---|---|---|---|---|
| Original | | | | | | Code Rates | | | | | | |
| Code | | | 1 2 | | 2 3 | | 3 4 | | 5 6 | | 7 8 | |
| K | $G_1$ | $G_2$ | P | $d_{free}$ | P | $d_{free}$ | P | $d_{free}$ | P | $d_{free}$ | P | $d_{free}$ |
| — | 171 | 133 | X = 1 Y = 1 | 10 | X = 10 Y = 11 | 6 | X = 101 Y = 110 | 5 | X = 10101 Y = 11010 | 4 | X = 1000101 Y = 1111010 | 3 |

TABLE 1-continued

Convalutional Code Puncture Patterns

| Original Code | | | Code Rates | | | | | | | |
|---|---|---|---|---|---|---|---|---|---|---|
| | | | 1 2 | | 2 3 | | 3 4 | | 5 6 | 7 8 |
| K | $G_1$ | $G_2$ | P | $d_{free}$ | P | $d_{free}$ | P | $d_{free}$ | P $d_{free}$ | P $d_{free}$ |
| | | | I = X | | I = $X_1 Y_1 Y_1$ | | I = $X_1 Y$ | | I = $X_1 Y_2 Y_4$ | I = $X_1 Y_2 Y_3 Y_4$ |
| | | | Q = $Y_1$ | | Q = $Y_1 X_1 Y_4$ | | Q = $Y_1 X$ | | Q = $Y_1 X_3 X_4$ | Q = $Y_1 Y_3 X_4 X$ |

NOTE:
1 = transmitted bit
0 = non transmitted bit

For Quadrature Amplitude Modulation with constellation sizes of 16 or 64 points (16 QAM OR 64 QAM), Trellis coded modulation will be used instead of straight convolutional encoding. For example with 16 QAM, classical rate ¾ and rate ⅞ trellis codes can be used. Also as an example for 64 QAM, rate ¹¹/₁₂ and rate ⅚ trellis codes can be used.

4.1.1.2.5 Modulation

TABLE 2

Specificatians for QPSK Modulation (Downstream)

| | |
|---|---|
| Modulation | QPSK, 16 QAM, or 64 QAM |
| Signal Constellation | QPSK |
| | Gray coded direct mapping (no differential encoding) of (I, Q) from bit pairs of convolutional decoder output as follows: |

| 01 | 11 |
|---|---|
| X | X |
| X | X |
| 00 | 10 |

| | |
|---|---|
| Transmission Rate | 33.333333 MBaud |
| Transmit Filtering | Root raised cosine filtering, rolloff factor, α = 0.20 |
| Channel Spacing | 40.00 MHz |
| Frequency Range | Region Dependent |
| Frequency Error | 5 MHz |
| Phase Noise | The phase noise shall not exceed the following levels |

| Freq offset [KHz] | Level [dBc/Hz] |
|---|---|
| 1 | −55 |
| 10 | −85 |
| 50 | −106 |
| 100 | −109 |
| 500 | −116 |
| 1000 | −122 |
| 2000 | −128 |

| | | |
|---|---|---|
| Transmit Spectral Mask | BW | Response |
| | (TBD) | |
| Carrier Suppression | >30 dB | |
| I/Q Amplitude Imbalance | <1 dB | |
| I/Q Phase Imbalance | <2.0 degrees | |

4.1.1.2.6 Baseband Pulse Shaping

Prior to modulation, the I and Q signals shall be filtered by square-root raised cosine filters. The excess bandwidth factor α shall be 0 20. The square-root raised cosine filter is defined by the following transfer function H:

$$H(f) = 1$$

$$\left\{ H(f) = \frac{1}{2} + \frac{1}{2} \sin \frac{\pi}{2f_N} \left[ \frac{f_N - |f_N|}{\alpha} \right] \right\}^{1/2}$$

for $f < f_N(1 - \alpha)$ for $f_N(1 - \alpha) \leq f \leq f_N(1 + \alpha)$ for $f > f_N(1 + \alpha)$ $$H(f) = 0$$

where $f_N = \frac{1}{2T} = \frac{R}{2}$ is the Nyquist frequency and excess bandwidth factor α = 0.20

4.1.2 TRANSMISSION CONVERGENCE LAYER

The downstream uses time division multiplexing on an ATM cell basis. The Asynchronous Transfer Mode stream is defined in [ITU-T 1.361]. An ATM stream is comprised of packets having 53 bytes, with a five byte header including connection identification and header error control, followed by 48 bytes of ATM payload. ATM cells are simply multiplexed into the payload of the MPEG-2 Transport Stream (MPEG-TS). A slot is defined as a time interval required to send a single ATM cell. Since the physical medium dependent (PMD) layer packet size is 187 bytes and does not correspond to an integer number of ATM cells, a means for achieving cell delineation is required. This can be achieved by packing an integer number of cells into one or more PMD layer packets and padding any leftover bytes with zeros, such as that proposed by the Digital Audio Visual Council (DAVIC). The DAVIC proposal calls for packing 7 ATM cells into the payload of two MPEG-TS packets which represents 0.8% overhead. This approach then uses the Reed-Solomon sync byte and a control byte which immediately succeeds the sync byte to indicate that the next byte corresponds to the start of a cell.

4.1.2.1 Mapping of ATM Cells

A framing structure is required to transport ATM over a LMDS network. This structure provides synchronization for interleaving and FEC block alignment appropriate to the coax environment. This function is similar to that provided by SDH and SONET frames for similar functions related to their respective environments.

This structure supports the carriage of the ATM services needed for DAVIC 1.0 and DAVIC 1.1 functionality. The applicability of this structure to other ATM services would need to be determined on a case by case basis. 188-byte ATM transport MUX packets shall be used for the carriage of ATM over a LMDS network. This packet structure provides synchronization and payload. The format of the packet structure is shown in FIG. 4. The steps (b), (c), and (d) shown in Figure shall also apply to ATM transport MUX packets.

The fields in the ATM transport MUX packets are defined as:

| | |
|---|---|
| SYNC | The sync byte is a fixed 8 bit field with value 01000111b used for frame synchronization |
| PAYLOAD | This field carries 187 bytes of payload and is described in detail below. |

A transmission convergence sublayer is used to map the ATM cells into the payload provided by the frame. Three bytes are defined for this functionality labeled CTRL0, CTRL1, and CTRL2. The alignment of the ATM cells is synchronized to a two packet sequence as shown below. This provides rapid cell delineation and cell delineation recovery after errors. The format is shown in FIG. 4.

| | |
|---|---|
| CTRL0 | This byte indicates that a packet is the first of the two packet sequence. Its value is E1PSSSSSb where E, P, and S bits are defined below. This also indicates that the first byte of an ATM cell immediately follows. |
| CTRL1 | This byte indicates that a packet is the second of a two packet sequence. Its value is E0PSSSSSb where E, P, and S bits are defined below. |
| CTRL2 | This byte is reserved. It will be defined for carriage of operation, administration, and maintenance information (OAM) |

Definition of E, P and S bit setting

| | |
|---|---|
| E (error) | The transport error indicator is a 1 bit flag. When set to "1", it indicates that at least 1 uncorrectable bit error exists in the associated packet. This bit may be set to "1" by entities in the transport layer. When set to "1", this bit shall not be reset to "0" unless the bit value(s) in error have been corrected. |
| P (priority) | The transport priority is a 1 bit indicator. When set to "1", it indicates that the associated packet is a greater priority than the packets with the transport priority set to "0". |
| SSSSS (stuffing) | This fixed 5 bit field with value 11110b. Any packet without this value should be discarded. This could indicate that the associated packet is used for stuffing purposes and does not contain valid payload. One or more of these packets may be placed anywhere in the stream. |

ATM Transport MUX packets and MPEG2 Transport MUX packets shall have a common physical media dependent sublayer. This means that usage of the High Reliability Marker, channel coding, byte-to-symbol mapping. QAM modulation and baseband filter characteristics shall apply in an identical way to the transport of ATM Transport MUX packets and MPEG2 Transport MUX packets.

4.1.2.2 Frame Delineation

The downstream TDM frame contains N=735 slots (N may be increased with alternative modulation and FEC rates as shown in Table 3) with a frame period of exactly 5.8752 ms. The choice of 5.8752 ms is sufficient to give a constant bit rate user with a 64 kbps telephony connection using AA1, 1 structured data transfer mode one cell per frame. This mode sends an average of 47.5 bytes every two frames. Table 3 through Table 6 illustrate how this framing period results in an integer number of time slots for QPSK, 16 QAM, and 64 QAM for both 20 and 40 MHz channels and different levels of forward error correction.

Frame delineation is achieved through the use of a Frame Start ATM cell which is assigned a VPF/VCI OF 0xFF/0xFFFF and uses ATM Adaptation Layer 5 (AAL5). The Frame Start may be a multiple cell protocol data unit (PDU) in which case all cells corresponding to the PDU will be sent consecutively at the beginning of each frame. The reception of the first cell of the Frame Start PDU shall denote the start of the frame. When the STB processing reads the VPP/VCI of the first cell of a Frame Start PDU, a downstream frame start epoch shall be generated, and the STB shall use the epoch to estimate upstream frame timing. The payload of the Frame Start PDU shall contain control and management data.

TABLE 3

Summary of Downstream Parameters, QPSK, 40 MHz Channels

| Description Status | Units | Downstream Modulation | | | | |
|---|---|---|---|---|---|---|
| Frame Period | ms | 5.875 | 5.875 | 5.875 | 5.875 | 5.875 |
| Time Slots per Frame | | 735.0 | 700.0 | 630.0 | 560.0 | 420.0 |
| ATM Cell Rate | cells/s | 125102 | 119145 | 107230 | 95316 | 71487 |
| ATM Rate | Mbps | 53.043 | 50.517 | 45.466 | 40.414 | 30.310 |
| Time Slot Efficiency | | 371/376 | 371/376 | 371/376 | 371/376 | 371/376 |
| Bit Rate | Mbps | 53.7582 | 51.1983 | 46.0784 | 40.9586 | 30.7190 |
| Reed Solomon Efficiency | | 47/51 | 47/51 | 47/51 | 47/51 | 47/51 |
| Convolutional Code Efficiency | | 7/8 | 5/6 | 3/4 | 2/3 | 1/2 |
| Coded Symbol Rate | Mbps | 66.667 | 66.667 | 66.667 | 66.667 | 66.667 |
| QPSK Modulation | | 2 | 2 | 2 | 2 | 2 |
| Channel Symbol Rate | Mbaud | 33.333 | 33.333 | 33.333 | 33.333 | 33.333 |
| Excess Badwidth | HzBaud | 1.2000 | 1.2000 | 1.2000 | 1.2000 | 1.2000 |
| Channel Bandwidth | MHz | 40.0000 | 40.0000 | 40.0000 | 40.0000 | 40.0000 |

TABLE 4

Downstream Parameters, QPSK, 20 MHz Channels

| Description Status | Downstream Modulation | | | | |
|---|---|---|---|---|---|
| Frame Period | 5.875 | 5.875 | 5.875 | 5.875 | 5.875 |
| Time Slots per Frame | 367.5 | 350.0 | 315.0 | 280.0 | 210.0 |
| ATM Cell Rate | 62551 | 59572 | 53615 | 47658 | 35743 |
| ATM Rate | 26.522 | 25.259 | 22.733 | 20.207 | 15.155 |
| Time Slot Efficiency | 371/376 | 371/376 | 371/376 | 371/376 | 371/376 |
| Bit Rate | 26.8791 | 25.5991 | 23.0392 | 20.4793 | 15.3595 |
| Reed Solomon Efficiency | 47/51 | 47/51 | 47/51 | 47/51 | 47/51 |
| Convolutional Code Efficiency | 7/8 | 5/6 | 3/4 | 2/3 | 1/2 |
| Coded Symbol Rate | 33.3333 | 33.3333 | 33.3333 | 33.3333 | 33.3333 |
| QPSK Modulation | 2 | 2 | 2 | 2 | 2 |
| Channel Symbol Rate | 16.6667 | 16.6667 | 16.6667 | 16.6667 | 16.6667 |
| Excess Bandwidth | 1.2000 | 1.2000 | 1.2000 | 1.2000 | 1.2000 |
| Channel Bandwith | 20.0000 | 20.0000 | 20.0000 | 20.0000 | 20.0000 |

TABLE 5

Summary of Downstream Parameters, 16 QAM

| Description Status | Units | Downstream Modulation | | | |
|---|---|---|---|---|---|
| Frame period | ms | 5.8752 | 5.8752 | 5.8752 | 5.8752 |
| Time Slots per Frame | | 1470 | 735 | 1260 | 630 |
| ATM Cell Rate | cells/s | 250204 | 125102 | 214461 | 107230 |
| ATM Rate | Mbps | 106.087 | 53.043 | 90.931 | 45.466 |
| Time Slot Efficiency | | 371/376 | 371/376 | 371/376 | 371/376 |
| Bit Rate | Mbps | 107.5163 | 53.7582 | 92.1569 | 46.0784 |
| Reed Solomon Efficiency | | 47/51 | 47/51 | 47/51 | 47/51 |
| Convolutional Code Efficiency | | 7/8 | 7/8 | 3/4 | 3/4 |
| Coded Symbol Rate | Mbps | 133.3333 | 133.3333 | 133.3333 | 133.3333 |
| QPSK Modulation | | 4 | 4 | 4 | 4 |
| Channel Symbol Rate | Mbaud | 33.3333 | 16.6667 | 33.3333 | 16.6667 |
| Excess Bandwidth | HzBaud | 1.2000 | 1.2000 | 1.2000 | 1.2000 |
| Channel Bandwith | MHz | 40.0000 | 20.0000 | 40.0000 | 20.0000 |

TABLE 6

Summary of Downstream Parameters, 64 QAM

| Description Status | Units | Downstream Modulation | | | |
|---|---|---|---|---|---|
| Frame period | ms | 5.8752 | 5.8752 | 5.8752 | 5.8752 |
| Time Slots per Frame | | 2310.0 | 2205.0 | 1155.0 | 1050.0 |
| ATM Cell Rate | cells/s | 393178 | 375306 | 196589 | 178717 |
| ATM Rate | Mbps | 166.708 | 159.130 | 83.354 | 75.776 |
| Time Slot Efficiency | | 371/376 | 371/376 | 371/376 | 371/376 |
| Bit Rate | Mbps | 168.9542 | 161.2745 | 84.4771 | 76.7974 |
| Reed Solomon Efficiency | | 47/51 | 47/51 | 47/51 | 47/51 |
| Convolutional Code Efficiency | | 11/12 | 7/8 | 11/12 | 5/6 |
| Coded Symbol Rate | Mbps | 200.0000 | 200.0000 | 100.0000 | 100.0000 |
| QFSK Modulation | | 6 | 6 | 6 | 6 |
| Channel Symbol Rate | Mbaud | 33.3333 | 33.3333 | 33.3333 | 33.3333 |
| Excess Bandwidth | HzBaud | 1.2000 | 1.2000 | 1.2000 | 1.2000 |
| Channel Bandwith | MHZ | 40.0000 | 40.0000 | 20.0000 | 20.0000 |

4.1.3 IF INTERFACE

| | |
|---|---|
| Downstream Frequency | 950 to 1800 MHz |
| Downstream signal level | −60 to −30 dBm |
| Phase Noise | The phase noise shall not exceed the following levels |

| Freq offset [KHz] | Level [dBc/Hz] |
|---|---|
| 1 | −51 |
| 10 | −81 |

-continued

| Freq offset [KHz] | Level [dBc/Hz] |
|---|---|
| 50 | −102 |
| 100 | −106 |
| 500 | −115 |
| 1000 | −121 |
| 2000 | −127 |

| | |
|---|---|
| Frequency Error | 5 MHz |
| DC Power | 24 VDC @ 1 amp |

4.2 UPSTREAM PHYSICAL LAYER

The upstream TDMA frame length is equal to the downstream TDM frame length (5.8752 ms). At the Access Node upstream receiver, the upstream frame shall have a fixed delay relative to the downstream frame. The STB shall adjust timing of upstream packet transmissions to coincide with the upstream frame slot boundaries at the Access Node receiver, i.e., the STB shall achieve upstream symbol synchrony (with the Access Node receiver) to a specified level of accuracy. There are two levels of upstream synchronization: (1) before net entry and (2) after net entry.

The maximum synchronization error before net entry is determined primarily by the STB uncertainty of two-way propagation delay, and the maximum uncertainty is determined by LMDS service cell radius. For STB net entry, net management shall allocate multiple contiguous slots as needed to form longer net entry slots such that TDMA packet collisions caused by STB net entry transmissions are precluded. The net entry procedure shall provide for synchronization pullin wherein the STB adjusts upstream timebase in response to feedback of synchronization error estimated by the Access Node. After the net entry the STB upstream synchronization shall error shall be maintained at less than one upstream symbol in length (packet guard time is 4 symbols). The Access Node shall provide periodic feedback of estimated upstream synchronization error to assist the STB in maintaining the specified synchronization accuracy after net entry.

4.2.1 PHYSICAL DEPENDENT LAYER

The coding and modulation of upstream packets is summarized in the block diagram of FIG. 9. The upstream ATM cell received from the transmission convergence layer shall be randomized for spectral shaping with a randomizer, and the randomized ATM cell shall be encoded for forward error correction by a Reed Solomon RS(63.53) code with 8-bit code symbols. The 4-byte sync preamble shall be appended to the ATM cell and the resultant coded packet is mapped into 1 Q baseband pulses to effect differentially encoded QPSK. The baseband modulation pulses shall be filtered with root-raised cosine filters having an excess bandwidth factor of =0.30 and the packet data shall be burst modulated onto the upstream RF waveform into an assigned slot.

The preceding operations at the subscriber node for upstream transmission shall be reversed at the Access Node end for reception of upstream burst transmissions.

4.2.1.1 Randomization for spectrum shaping

For the upstream packet, only the ATM cell of the packet shall be randomized. The randomizer shall be the linear feedback shift register (LFSR) with generating polynomal $x^6+x^3+1$. The initial contents of the register shall be all ones, and the LFSR shall be reset to initial condition at the beginning of each ATM cell. At the Access Node the complementary self-synchronizing feed-forward linear shift register derandomizer shall be used.

4.2.1.2 Reed-Solomon coding

Reed Solomon coding shall be applied to each randomized ATM cell. The code shall be the shortened systematic Reed-Solomon code RS(63.53, T=5). The specified code generator polynomials are given by:

Code Generator Polynomial:

$$g(x)=(x+\mu^0)(x+\mu^1)(x+\mu^2) \ldots (x+\mu^9),$$

where $\mu=0.2$ hex

Field Generator Polynomial:

$$p(x)=X^8+X^4+X^3+X^2+1$$

The specified code has a block length of 255 bytes, and shall be configured as a RS(255.245, T=5) code with information bits preceded by 192 zero symbols. The resultant code will correct T=5 byte errors in each code word.

4.2.1.3 Modulation

TABLE 7

Specifications for QPSK Modulation (Upstream)

| | |
|---|---|
| Modulation | Differentially encoded QPSK |
| Differential Encoding | The differential encoder shall accept bits A, B in sequence and generate phase changes as follows: |

| A | B | Phase Change |
|---|---|---|
| 0 | 0 | none |
| 0 | 1 | +90 degrees |
| 1 | 1 | 180 degrees |
| 1 | 0 | −90 degrees |

Signal Constellation

| 01 | 11 |
|---|---|
| X | X |
| X | X |
| 00 | 10 |

| | |
|---|---|
| Transmission Rate | Integer divisors of the downstream symbol rate |
| Transmit Filtering | Root raised cosine filtering, rolloff factor, α = 0.30 |
| Data Randomization | Data shall be randomized by input of ATM cell into linear feedback shift register (LFSR) with generator polynomial $X^6 + X^5 + 1$. Sync bytes shall not be randomized, and the LFSR shall be initialized at the beginning of each ATM cell. |
| Frequency Range | Region Dependent |
| Frequency Resolution | 500 Hz |
| Transmit Spectral Mask | BW     Response |
| | (TBD) |
| Carrier Suppression | 30 dB |
| I/Q Amplitude Imbalance | 1 dB |
| I/Q Phase Imbalance | 2.0 degrees |
| C/N at the demodulator input (Nyquist bandwidth) | TBD |

4.2.1.4 Specifications for the IF Interface

The location of the downstream Physical Interface is an intermediate frequency (IF) interface between the Radio Frequency Unit (RFU) and the UPI STB at the UPI STB Specifications for the Interface upstream is shown in Table 8.

TABLE 8

Specifications for the Physical Interface (Upstream)

| | |
|---|---|
| Upstream Frequency | 200 to 400 MHz |
| Upstream signal level | −40 to −10 dBm |
| Channel Spacing | N × 100 kHz N_9 |
| Channel Bandwidth | 1–2.5 MHz Grade A |
| | 1–26 MHz Grade B |
| Phase Noise | The phase noise shall not exceed the following levels |

| Freq offset [kHz] | Level [dBc/Hz] |
|---|---|
| 1 | −51 |
| 10 | −82 |
| 50 | −103 |
| 100 | −109 |

TABLE 8-continued

Specifications for the Physical Interface (Upstream)

|  |  |  |
|---|---|---|
|  | 500 | −120 |
|  | 1000 | −126 |
|  | 2000 | −126 |
| Frequency Resolution | 500 Hz |  |
| DC Power | 18 VDC @ 1.5 amps (ON/OFF selectable) |  |
| Return Loss | ≧13 dB (in band) |  |
| Impedance | 75 Ω |  |
| Physical Connector Type | F-Type, female (or IEC - 169-2 female) |  |

4.2.2 TRANSMISSION CONVERGENCE LAYER

The specified upstream time slot structure is shown in FIG. 10. A slot is 68 bytes long, consisting of a sync preamble, one ATM cell, 10 R. Reed Solomon check bytes and 1 byte of guard time for upstream synchronization error. The sync preamble consists of a 16 bit Neuman-Hoffman sequence, BPSK modulated. At the QPSK modulator input before Gray scale mapping, the preamble is expressed as 00FCFCF3.

The one-byte guard time provides for upstream synchronization error after net entry. The preamble supports pull-in of upstream timing during net entry, as well as measurement of upstream timing error to support maintenance of upstream synchronization after net entry.

The upstream frame consists of F slots where F depends on the upstream modulation rate used. The F slots of a frame are partitioned into polling slots, contention slots, and traffic slots. The relative number of these three types of slots are dynamic at the discretion of the slot assignment functions, under the constraint that their total is F.

TABLE 9

Example Upstream Parameters far QPSK, 40 MHz Downstream Channel

| | | $R_{xd}/R_{xo}$ | | | | |
|---|---|---|---|---|---|---|
| Description | Units | 15 | 12 | 10 | 5 | 4 |
| Frame Period | ms | 5.875 | 5.875 | 5.875 | 5.875 | 5.875 |
| Time Slots per Frame | | 24.0 | 30.0 | 36.0 | 72.0 | 90.0 |
| ATM Cell Rate | cells/s | 4085 | 5106 | 6127 | 12255 | 15319 |
| ATM Rate | Mbps | 1.732 | 2.165 | 2.598 | 5.196 | 6.495 |
| Time Slot Efficiency | | 63/68 | 63/68 | 63/68 | 63/68 | 63/68 |
| Bit Rate | Mbps | 1.8695 | 2.3369 | 2.8042 | 5.6085 | 7.0106 |
| Reed Solomon Efficiency | | 53/63 | 53/63 | 53/63 | 53/63 | 53/63 |
| Coded Symbol Rate | Msps | 2.2222 | 2.7778 | 3.3333 | 6.6667 | 8.3333 |
| QPSK Modulation | | 2 | 2 | 2 | 2 | 2 |
| Channel Symbol Rate | Mbaud | 1.1111 | 1.3889 | 1.6667 | 3.333 | 4.1667 |
| Excess Bandwidth | Hz/Baud | 1.3000 | 1.3000 | 1.3000 | 1.3000 | 1.3000 |
| Channel Bandwidth | MHZ | 1.4444 | 1.8056 | 2.1667 | 4.3333 | 5.4167 |

TABLE 10

Upstream Parameters for QPSK, 20 MHz Downstream Channels

| | | $R_{xd}/R_{xo}$ | | | | |
|---|---|---|---|---|---|---|
| Description | Units | 16 | 16 | 12 | 9 | 8 |
| Frame Period | ms | 5.875 | 5.875 | 5.875 | 5.875 | 5.875 |
| Time Slots per Frame | | 40.0 | 45.0 | 60.0 | 80.0 | 90.0 |
| ATM Cell Rate | cells/s | 6808 | 7659 | 10212 | 13617 | 15319 |
| ATM Rate | Mbps | 2.887 | 3.248 | 4.330 | 5.773 | 6.495 |
| Time Slot Efficiency | | 63/68 | 63/68 | 63/68 | 63/68 | 63/68 |
| Bit Rate | Mbps | 3.1158 | 3.5053 | 4.6737 | 6.2316 | 7.0106 |
| Reed Solomon Efficiency | | 53/63 | 53/63 | 53/63 | 53/63 | 53/63 |
| Coded Symbol Rate | Msps | 3.7037 | 4.1667 | 5.5556 | 7.4074 | 8.3333 |
| QPSK Modulation | | 2 | 2 | 2 | 2 | 2 |
| Channel Symbol Rate | Mbaud | 1.8519 | 2.0833 | 2.7778 | 3.7037 | 4.1667 |
| Excess Bandwidth | Hz/Baud | 1.3000 | 1.3000 | 1.3000 | 1.3000 | 1.3000 |
| Channel Bandwidth | MHz | 2.4074 | 2.7083 | 3.6111 | 4.8148 | 5.4167 |

TABLE 11

Upstream Parameters for 16 QAM Downstream, 40 MHz Channels

| | | \multicolumn{5}{c}{$R_{xd}/R_{xo}$} | | | | |
|---|---|---|---|---|---|---|
| Description | Units | 18 | 16 | 12 | 9 | 8 |
| Frame period | ms | 5.8752 | 5.8752 | 5.8752 | 5.8752 | 5.8752 |
| Time Slots per Frame | | 80.0 | 90.0 | 120.0 | 160.0 | 180.0 |
| ATM Cell Rate | cells/s | 13617 | 15319 | 20425 | 27233 | 30637 |
| ATM Rate | Mbps | 5.773 | 6.495 | 8.660 | 11.547 | 12.990 |
| Time Slot Efficiency | | 63/68 | 63/68 | 63/68 | 63/68 | 63/68 |
| Bit Rate | Mbps | 6.2316 | 7.0106 | 9.3474 | 12.4633 | 14.0212 |
| Reed Solomon Efficiency | | 53/63 | 53/63 | 53/63 | 53/63 | 53/63 |
| Coded Symbol Rate | Msps | 7.4074 | 8.3333 | 11.1111 | 14.8148 | 16.6667 |
| QPSK Modulation | | 2 | 2 | 2 | 2 | 2 |
| Channel Symbol Rate | Mbaud | 3.7037 | 4.1667 | 5.5556 | 7.4074 | 8.3333 |
| Excess Bandwidth | Hz/Baud | 1.3000 | 1.3000 | 1.3000 | 1.3000 | 1.3000 |
| Channel Bandwidth | MHz | 4.8148 | 5.4167 | 7.2222 | 9.6296 | 10.8333 |

TABLE 12

Upstream Parameters for 16 QAM, 20 MHz Downstream Channels

| | | \multicolumn{5}{c}{$R_{xd}/R_{xo}$} | | | | |
|---|---|---|---|---|---|---|
| Description | Units | 18 | 16 | 12 | 9 | 8 |
| Frame Period | ms | 5.8752 | 5.8752 | 5.8752 | 5.8752 | 5.8752 |
| Time Slots per Frame | | 40.0 | 45.0 | 60.0 | 80.0 | 90.0 |
| ATM Cell Rate | cells/s | 6808 | 7659 | 10212 | 13617 | 15319 |
| ATM Rate | Mbps | 2.887 | 3.248 | 4.330 | 5.773 | 6.495 |
| Time Slot Efficiency | | 63/68 | 63/68 | 63/68 | 63/68 | 63/68 |
| Bit Rate | Mbps | 3.1158 | 3.5053 | 4.6737 | 6.2316 | 7.0106 |
| Reed Solomon Efficiency | | 53/63 | 53/63 | 53/63 | 53/63 | 53/63 |
| Coded Symbol Rate | Msps | 3.7037 | 4.1667 | 5.5556 | 7.4074 | 8.3333 |
| QPSK Modulation | | 2 | 2 | 2 | 2 | 2 |
| Channel Symbol Rate | Mbaud | 1.8519 | 2.0833 | 2.7778 | 3.7037 | 4.1667 |
| Excess Bandwidth | Hz/Baud | 1.3000 | 1.3000 | 1.3000 | 1.3000 | 1.3000 |
| Channel Bandwidth | MHz | 2.4074 | 2.7083 | 3.6111 | 4.8148 | 5.4167 |

TABLE 13

Upstream Parameters for 64 QAM Downstream, 40 MHz Channels

| | | \multicolumn{5}{c}{$R_{xd}/R_{xo}$} | | | | |
|---|---|---|---|---|---|---|
| Description | Units | 18 | 16 | 12 | 9 | 8 |
| Frame Period | ms | 5.8752 | 5.8752 | 5.8752 | 5.8752 | 5.8752 |
| Time Slots per Frame | | 120.0 | 135.0 | 180.0 | 240.0 | 270.0 |
| ATM Cell Rate | cells/s | 204525 | 22978 | 30637 | 40850 | 45956 |
| ATM Rate | Mbps | 8.660 | 9.743 | 12.990 | 17.320 | 19.485 |
| Time Slot Efficiency | | 63/68 | 63/68 | 63/68 | 63/68 | 63/68 |
| Bit Rate | Mbps | 9.3474 | 10.5159 | 14.0212 | 18.6949 | 21.0317 |
| Reed Solomon Efficiency | | 53/63 | 53/63 | 53/63 | 53/63 | 53/63 |
| Coded Symbol Rate | Msps | 11.1111 | 12.5000 | 16.6667 | 22.2222 | 25.0000 |
| QPSK Modulation | | 2 | 2 | 2 | 2 | 2 |
| Channel Symbol Rate | Mbaud | 5.5556 | 6.2500 | 8.3333 | 11.1111 | 12.5000 |
| Excess Bandwidth | Hz/Baud | 1.3000 | 1.3000 | 1.3000 | 1.3000 | 1.3000 |
| Channel Bandwidth | MHz | 7.2222 | 8.1250 | 10.8333 | 14.4444 | 16.2500 |

TABLE 14

Upstream Parameters for 64 QAM, 20 MHz Downstream Channels

| | | $R_{xd}/R_{xo}$ | | | | |
|---|---|---|---|---|---|---|
| Description | Units | 18 | 15 | 12 | 9 | 8 |
| Frame Period | ms | 5.8752 | 5.8752 | 5.8752 | 5.8752 | 5.8752 |
| Time Slots per Frame | | 60.0 | 72.0 | 90.0 | 120.0 | 135.0 |
| ATM Cell Rate | cells/s | 10212 | 12255 | 15319 | 20425 | 22978 |
| ATM Rate | Mbps | 4.330 | 5.196 | 6.495 | 8.660 | 9.743 |
| Time Slot Efficiency | | 63/68 | 63/68 | 63/68 | 63/68 | 63/68 |
| Bit Rate | Mbps | 4.6737 | 5.6085 | 7.0106 | 9.3474 | 10.5159 |
| Reed Solomon Efficiency | | 53/63 | 53/63 | 53/63 | 53/63 | 53/63 |
| Coded Symbol Rate | Msps | 5.5556 | 6.6667 | 8.3333 | 11.1111 | 12.5000 |
| QPSK Modulation | | 2 | 2 | 2 | 2 | 2 |
| Channel Symbol Rate | Mbaud | 2.7778 | 3.3333 | 4.1667 | 5.5556 | 6.2500 |
| Excess Bandwidth | Hz/Baud | 1.3000 | 1.3000 | 1.3000 | 1.3000 | 1.3000 |
| Channel Bandwidth | MHz | 3.6111 | 4.333 | 5.4167 | 7.2222 | 8.1250 |

4.3 MAC PROTOCOLS AND SCENARIOS

4.3.1 INTRODUCTION

This document describes the messages for establishing, maintaining, and managing the physical wireless media for communication between an AIU (Air Interface Unit) at the head-end access node and an NIU (Network Interface Unit) at the subscriber premises. Examples of scenarios such as an NIU entering the network or requesting more resources are given. The messages can be combined in a sequence that would create another scenario and, thus, the scenarios given are not to be interpreted as the only possible scenarios. However, the scenarios given show the sequence of messages that shall occur for the given scenarios. The messages given are the exact specification of the messages between the AIU and NIU across the A1 interface that may be transmitted as the MAC flow. Higher layer flows are not addressed here. Only the messages for set-up of the connections for carrying those higher layer flows are defined here.

The MAC flow is bi-directional supported by modems at the AIU and NIU. Messages may be sent downstream to the NIU or upstream to the AIU. Both the downstream and upstream are divided into time slots that encapsulate exactly one ATM cell. The modulators at the AIU transmit one or more downstream frequency channels. However, only one downstream frequency channel may be received by the NIU at any instance. The NIU may switch to a different downstream frequency channel, but this switch may require time on the order of many time slots. Likewise, the NIU is only capable of transmitting on one upstream frequency channel at an instance in time. However, the NIU may be capable of transmitting on one frequency channel for one time slot and transmit on a different frequency channel for the following time slot.

The MAC flow uses ATM layer encapsulation for all messages. As such, it is equally applicable to both ATM-based or ATM/MPEG2-TS-based systems.

4.3.2 TIME SLOT TYPES

The downstream scheme is time division multiplex and the time slot types are divided into frame start slots and random access slots. The upstream scheme is time division multiple access and the time slot types are divided into polling response slots, contention slots, and reserved time slots. The control and management messages, sent across A1 between the AJU CPU and the NIU/STB CPU must be singlecell AAL5 PDUs. All MAC messages shall be encapsulated within an ATM cell that shall use the UNI cell header format. The AIU shall not send more than 7 percent of the frame, or about 50 cells per 6 msec frame, encapsulating MAC PDUs to any one NIU in order to set a limit on the amount of processing required by the NIU/STB. These cells which contain MAC PDUs include those broadcast via frame start to all NIUs and cells directed to the specific NIU. The poll [P] time slots sent from the NIU only contain MAC messages. The contention [C] time slots sent from the NIU may carry MAC messages or higher layer data. Reserved time slots sent from the NIU carry AAL5 or AAL1, for voice data, ATM cells and QAM control message cells. Since the random access time slots downstream and the reserved time slots upstream shall transport higher layer data over an AAL5 or AAL1 virtual connection, these time slots are referenced as [VC].

4.3.2.1 Acronyms

FS: Frame Start Time Slot

FS.P Polling Request Type with Non-zero Poll slot td

C: Contention Time Slot

P: Poll Response Time Slot

VC: Virtual Channel (Asynchronous)

4.3.2.2 Downstream Time Slots

Frame Start Time Slot

The first frame start time slot [FS] always occurs on the first time slot in the downstream frame in order that the NIU may determine the beginning of the downstream frame and synchronize its upstream frame to it. This time slot always encapsulates the first cell of a single or multi-cell AAL5 SDU. The AAL5 SDU is referenced as FS. The VPI/VCI of the FS is always 0xFF·0XFFFF to flag that the SDU is the frame start. An ALL5 SDU with the VPI/VCI of frame start shall only occur once in a frame as the first AAL5 SDU in the frame. A non-zero poll slot id flags that an NIU is being polled and should respond in a polling response time slot [P]. The niu__id field in the message identifies which NIU is being polled. Often, one of the polling request messages is a status request message. Following the polling request messages, the AIU typically sends a feedback message providing feedback to the NIU that is designated by the niu in the message. The polling requests referred to as FS.P. The AIU may fill the remaining bytes of the frame start with any MAC message.

| Frame start ( ) | Bits | Bytes | Bit Number/Description |
| --- | --- | --- | --- |
| {
MAC messages
} | | | |

4.3.2.3 Random Access Time Slots

The random access slots [VC] are all the time slots in the downstream frame except the frame start time slots. This is all the downstream time slots except the first time slots in the frame. The AIU may transmit on any of these time slots whenever it has any cells that need to be transmitted to an NIU. The cells may be OAM cells or part of and adaptation layer SDU, e.g. AAL5. The random access slots are referenced by the symbol VC because they are utilized in a more true ATM sense rather than being synchronous or semi-synchronous due to physical layer constraints because these are the only downstream time slots on which higher layer cells may be transmitted on a virtual connection. The only exception to these time slots being asynchronous is that all the MAC PDU transmitted on a MAC VC other then the frame start broadcast VC, shall be in time slots immediately following frame start. Thus, these time slots are synchronous.

Downstream Frame

The following figure illustrates the downstream frame with N time slots per frame. The frame start time slots always start in the first time slot. All other time slots in the frame are available for the AIU to transport time division multiplexed virtual connection. If there is one virtual connection which is the session connection for transporting MAC messages, it would be in time slot number 2.

| Slot # | AIU |
| --- | --- |
| 1 | [FS] |
| 2 | [VC] |
| 3 | [VC] |
| N | [VC] |

4.3.2.4 Upstream Time Slots
Poll Time Slots

The poll time slots [P] are the time slots in the upstream frame that are allocated to only one or many NIU, but may only be utilized for a poll response after receiving a poll request from the AIU. The poll time slots may only encapsulate a single-cell AAL5 SDU whose payload shall only be MAC messages defined in this document. The VPF/VCI is always 0xFF niu_id.

Contention Time Slots

The contention time slots [C] are the time slots in the upstream frame that may be allocated to do more than one NIU and, thus, utilizing the contention time slot may cause a collision with another NIU utilizing the same contention time slot. If a collision occurs, then the contention must be resolved via any number of well-known algorithms implemented in the NIU, such as random retransmission delays based on the niu_id, to determine how many frames the NIU shall wait before retransmission. The contention time slots may encapsulate a single-cell AAL5 SDU whose PDU may be MAC messages defined in this document, a single cell AAL5 SDU consisting of a higher layer data, or a cell of a multi-cell AAL5 SDU consisting of higher layer data. The NIU shall always use VPI/VCI 0xFF/niu_id for transmission of a MAC message PDU and the VPI/VCI of the higher layer data on contention time slots.

Reserved Time Slots

The reserved time slots [VC] are the time slots in the upstream frame that are allocated to only one NIU, i.e., they are reserved for use by one NIU. The NIU may transmit on any of these time slots whenever it has any cells that need to be transmitted to the AIU or across the A4 interface via the AIU. The cells may be OAM cells or part of an adaptation layer SDU, e.g. AAL5. The reserved time slots are referenced by the symbol VC because they are utilized in a more true ATM sense rather than being synchronous or semi-synchronous due to physical layer constraints.

4.3.3 MESSAGE STRUCTURE AND MESSAGE TYPES

The MAC messages all utilize the same basic structure as outlined below. Every message consists of the fields: niu_id, msg_length, poll_slot_id, msg_type, num_msg_items, and a list of the msg_items. Each message item table in this document describes the fields for the message items of the type designated by one of the message types in the message type table. The message header, i.e., the niu_id, msg_length, poll_slot_id, msg_type, and num_msg_items is not shown in these tables. Only one instance of the fields for a single item in the msg_items field of the message is given in each message item table. If in the message header the number of message items is greater than one, the message will contains more than on instance of the message item. All message fields are unsigned unless otherwise stated. The type of each field is sufficiently defined by the following message item tables in this document.

| msg ( ) | Bits | Bytes | Bit Number/Description |
| --- | --- | --- | --- |
| {
niu_id | 16 | 2 | |
| msg_length | 16 | 2 | |
| poll_slot_id | 8 | 1 | Designates poll response slot. |
| msg_type | 8 | 1 | Identifies the message type |
| num_msg_items | 8 | 1 | # of message items being sent |
| msg_items
} | | | Variable Length |

The niu_id is a unique identifier of a specific NIU in the polling list of NIUS for a group of downstream and corresponding group of upstream frequency channels on which the NIU may receive and transmit, respectively. An niu_id=$FFFF is used to indicate all NIUs, i.e., it is the "multicast" ID. The VC header may direct this message to only one NIU or may broadcast the message. The msg_length indicates the number of bytes following the msg_length field in this message. This field makes it easier for an NIU to find the second message in the cell or AAL5 SDU. Note that the first message may be for one NIU, whereas, the second message may be for a different NIU. The Poll_slot_id indicates which of the allocated polling response time slots shall be utilized on the upstream frame that is designated by the synchronous time slot delay. A value of 0 indicates that the NIU is not being polled by this message, and this message is not enabling use of any of the polling response time slots. The msg_type is one of the messages in the msg_type table. The num_msgs_items is the number of items of the designated message type that are in the given instantiation of the message. The msg_items is the list of items of the type designated by the msg type.

The following message type table lists the types of MAC messages in the order that they shall be enumerated. Any message types added to this table in the future must be added at the end of the enumeration list. In the message type table, the slot type indicates the type of time slot m which the message of that type would most likely be encapsulated.

| msg_type | Slot Type | Delivery | Description |
|---|---|---|---|
| reservation_request | [C] | AIU←NIU/STB | NIU request for seserved time slots. |
| reserved_slot_allocation | [FS, VC] | AIU→NIU/STB | Allocation/deallocation of reserved time slots. |
| contention_slot_allcation | [FS, VC] | AIU→NIU/STB | Allocation/deallocation of contention time slots. |
| poll_slot_allocation | [FS, VC] | AIU→NIU/STB | Allocation/deallocation of poll time slots. |
| sign_on_request | [FS] | AIU→NIU/STB | Parameters for an NIU to enter the network. |
| tax_calibration | [FS, VC] | AIU→NIU/STB | NIU transnit freq.power.time corrections |
| status_request | [FS, VC] | AIU→NIU/STB | Request specified NIU status items. |
| status_response | [P] | AIU←NIU/STB | Request NIU status items. |
| configuration | [FS, VC] | AIU→NIU/STB | Several NTU configuration items. |
| configuration_ack | [P] | AIU←NIU/STB | Acknowledgment of receipt of config items. |
| session_request | [C] | AIU←NIU/STB | NIU request a session/control connection. |
| session_connection | [FS, VC] | AIU→NTU/STB | AIU assigns VPI/VCI for session connection. |
| session_release | [FS, VC] | AIU←→NIU/STB | AIU or NIU releases a session connection. |
| session_msg_ack | [FS, VC, C, P] | AIU←→NIU/STB | Acknowledgment of receipt of the 3 above msgs. |
| new_downstream_channel | [FS, VC] | AIU→NIU/STB | Command NIU to enter net on new channel. |
| contention_slot_feedback | [FS] | AIU→NIU/STB | Contention slot stabilization feedback. |

4.3.4 IDLE CELL

The NIU shall transmit on every reserved time slot. If no data is available, an idle cell as defined by the ATM Forum shall be transmitted. The AIU may deallocate reserved time slots for an NIU that is not utilizing the reserved time slots for data. The idle cells may be used to determine upstream transmit signal calibration corrections, upstream BER, reserved time slot utilization, and NIU acknowledgment of reserved time slot allocation/deallocation.

4.3.5 UPSTREAM TIME SLOT ALLOCATION

The MAC upstream slot allocation scenario depicts how reserved, contention, and polled time slots for transmitting upstream from the NIU are allocated and deallocated. The only difference in the scenario for each of the different type of time slots is that reserved time slots may be requested by the NIU, and the contention_slot_feedback message would serve to acknowledge the request. The contention and polled time slots are never requested by the NIU. The AIU decides which upstream frequency channels and time slots of those channels should be allocated to each NIU as a contention or polled time slot. The reserved time slot allocation differs from the contention and polled time slot allocation in that the NIU may request reserved time slots. However, the reserved times slots, like the contention and polled time slots, may be allocated by the AIU without a request from the NIU. The time slot allocation messages may be sent as an update of a previously sent message rather than a change of allocation. This is shown in the scenario. The three types of time slot allocation messages are also similar in structure. Each is designated by a different message type but the fields are identical.

| reservation_request( ) | Bits | Bytes | Bit Number/Description |
|---|---|---|---|
| { | | | |
| num_time_slots | 8 | 1 | |
| min_VBR_packet_size | 16 | 2 | number of 48 byte cell payloads |
| } | | | |
| reserved_slot_allocation( ) | Bits | Bytes | Bit Number/Description |
| { | | | |
| time_slot_allocation | | | |
| } | | | |

| contention_slot_allocation( ) | Bits | Bytes | Bit Number/Description |
|---|---|---|---|
| { | | | |
| time_slot_allocation | | | |
| } | | | |
| poll_slot_allocation( ) | Bits | Bytes | Bit Number/Description |
| { | | | |
| time_slot_allocation | | | |
| } | | | |
| time_slot_allocation( ) | Bits | Bytes | Bit Number/Description |
| { | | | |
| upstream frequency | 16 | 2 | 100 kHz at LF frequency |
| time_slot_page | 8 | 1 | |
| num_frames | 8 | 1 | 0 = infinite frames |
| is change | 1 | 1 | MSB, 0 = update, 1 = change |
| num_time_slots | 7 | | 7 LSB |
| time_slot_list | 8 per | 1 per | pos_allocate, neg_deallocate |
| } | | | | reservation_request

When the NIU determines that it needs more reserved time slots for user traffic, it requests more slots. The AIU decided how many reserved time slots to allocate to the NIU. If the NIU still needs more reserved time slots, it will send another reserved slot request to the AIU. The NIU may send in this message the number of time slots that it believes that it needs or always set the num_time_slots field to 1. The min_VBR_packet_size is the number of cells that are buffered at the NIU awaiting upstream transmission. Note that a cell in this case is considered to be 48-bytes.

reserved_slot_allocation

The reserved_slot_allocation message changes or updates the allocation of upstream reserved time slots for an NIU. The reserved time slots are the time slots typically used for higher user traffic. The NIU shall transmit an idle message cell on every reserved time slot for which the NIU does not have any data ready to transmit. After the NIU is initially calibrated and is allocated reserved time slots, the calibration correction parameters for the signal transmitted upstream from the NIU may be determined from the receipt of the reserved time slots.

contention_slot_allocation

The contentions_slot_allocation message changes or updates the allocation of upstream contention time slots for an NIU. Contention time slots may not be used for user traffic. If upstream traffic is mostly bursty data traffic, then contention time slot demand for time slot requests may be high. In order to stabilize the contention time slot retransmission algorithm, the AIU must send a contention_slot_feedback message in every frame start that indicates the usage of the allocated contention time slots.

poll_slot_allocation

The poll_slot_allocation message changes or updates the allocation of upstream polling response time slots for an NIU. Guard time slots are not allocated in the poll time slot allocation. The synchronous_time_slot_delay is the number of upstream frames that the poll response shall be delayed. See the sign_on_request message for a description of the synchronous time slot delay. For each new polling response time slot that is allocated via a downstream channel, a poll_slot_id shall be assigned by the AIU and indicated in the poll_slot_id field of this message. A poll_slot_id shall not be duplicated for slots on different upstream channel which are allocated via the same downstream channel. The poll_slot_id must be unique for all upstream time slots associated with a given downstream channel.

time_slot_allocation

The time_slot_allocation field is common to all time slot allocation messages. A time slot allocation type message may be used to change or to update the allocation of any type of upstream time slots for an NIU. Each time slot is referenced by frequency channel and time slot page such that a single time slot is a single element in a 2-dimensional array. The upstream_frequency designates the upstream at the NIU/IF output in 100 kHz steps. The time_slot_page designates the group of 128 time slots where 0 indicates time slots 0 through 127 and 1 indicates time slots 128 through 255. The num_frames is the number of upstream frames for which the NIU is allocated the time slots in the subsequent time slot list. This is set to 0 to mean that the time slots are being allocated indefinitely. The first time slot is in the frame designated during sign-on as the synchronous_time_slot_delay. The is_change bit indicates whether this message is allocating or deallocating time slots on the stated page of the frequency channel or is only an update which lists the time slots that are currently allocated for the NIU. Num_time_slots is the number of time slots from 0 to 127 that are in the following list for the channel and page. The time_slot_list is a list of numbers that correspond to each time slot on the page. The first time slot is referred to as 0, and the last time slot on the page is referred to as 127. If the time slot number is positive, i.e., the MSB is cleared, then the time slot is allocated. If the time slot number is negative, i.e., the MSB is set, then the time slot is deallocated.

Example Upstream Time Slot Allocation

The following figure illustrates two consecutive upstream frame with ten time slots per frame. In this example, assume that the three NIUs transmit on only one upstream frequency channel and that the channel is the same for all three. A possible allocation of the three types of upstream time slots at an instant in time is shown. The polling response time slot is slot number one for all three NIUs. In this case, time slots 2 and 3 are not allocated and, thus, can be guard time slots. That is, if NIU=1 transmits late and actually the polling response is received at the AIU during time slot number 2, then the polling response does not interfere with any time slots allocated to other NIUs. Also, note that NIU #4 has not entered the network yet and, thus has not yet been allocated any time slots other than the polling response time slot that is to be used for network entry.

TABLE 15

Example Upstream Time Slot Allocation

| slot # | NIU #1 | NIU #2 | NIU #3 | NIU #4 |
|---|---|---|---|---|
| 1 | [P] | [P] | [P] | [P] |
| 2 | | | | |
| 3 | | | | |
| 4 | [C] | [C] | [C] | |
| 5 | | | [C] | |
| 6 | | [C] | [C] | |
| 7 | | | [VC] | |
| 8 | | [VC] | | |
| 9 | | | [VC] | |
| 10 | | | [VC] | |
| 1 | [P] | [P] | [P] | [P] |
| 2 | | | | |
| 3 | | | | |
| 4 | [C] | [C] | [C] | |
| 5 | | | [C] | |
| 6 | | [C] | [C] | |
| 7 | | | [VC] | |
| 8 | | [VC] | | |
| 9 | | | [VC] | |
| 10 | | | [VC] | |

4.3.6 POLLING HANDSHAKE

The NIU shall be polled periodically to establish communication and maintain communication with the NIU. If no other messages are flowing from the AIU to the NIU, the AIU shall poll each NIU assigned to that AIU at an interval of less than or equal to 2 seconds. This is for proper upstream transmit signal calibration and to facilitate network entry both before the NIU has determined which downstream frequency is polling it and while waiting for configuration. The polling handshake is initiated by the AIU with a poll_request which shall be designated by the poll_slot_id field in the message header set to a non-zero value. The NIU responds on the upstream polling time slot that is referenced by the poll_slot_id in the message header and the AIU has allocated to the NIU. If the most recent poll request from the AIU does not include a poll_slots_allocation message in the frame, the NIU shall assume that the time slots allocated for the polling response are the same as indicated in the previous poll_slots_allocation messages that it received from the AIU. If more than one time slot in a frame period is allocated for polling, the NIU shall respond on the time slot that is referenced by the poll_slot_it. If the NIU is not aligned in time, the NIUs response may be received at the AIU during the time slots following the desired polling response time slot. Guard time slots must not be allocated by the AIU as reserved, contention or poll time slot for any NIU if the current NIU being polled is not time aligned. Only 1 polling time slot may need to be allocated otherwise. The guard time slots must follow the poll_time_slot. Also, the NIU must attempt to respond on the first time slot in order to do timing calculations. Polling of the NIUs that have not been calibrated, i.e., are entering the net, should be done consecutively so that the head-end can allocate the guard time slots for contention usage for the longest amount of time. The polling handshake may include a third message referred as poll_feedback. The poll response may be a status response message. Tx calibration is a type of message that may be included as poll_feedback. If the NIU/STB losses power, it may remember the assigned niu_id and resources, i.e., connections and time slots. If the NIU remembers its niu_id, it responds to messages from the AIU using that niu_id. Otherwise, the NIU must wait to receive a sign_on_request message. If the NIU does not remember its allocated resources, then it must not remember its niu_id, so that the lack of response to the niu_id indicates to the AIU that the resources allocated to the NIU are no longer valid for that NIU and should be released. The AIU shall declare that the NIU is not responding if the AIU has not received a response to a polling request for 10 seconds. Note that this assumes that the AIU is polling the NIU a minimum of every 2 seconds as stated in this document. If the lack of NIU response or lack of receipt of the response at the AIU is due to a temporary loss of communication versus a more catastrophic loss of power, then this 10 seconds interval accommodates most periods of communication loss. If, however, a communication loss is sustained for a period longer than 10 seconds, then the AIU shall a transmit a sign_on_request message to the NIU with a different niu_id. The association of a new niu_id with the serial number in the sign_on_request message indicates to the NIU that the AIU has lost communication with the NIU and,thus, that the AIU has released the allocated resources for that NIU, and the NIU shall release its allocated resources. The AIU shall not transmit a new niu_id for an NIU via the sign_on_request message unless the AIU is releasing all the resources allocated for that NIU. For every new niu_id, the NIU shall perform the network entry process again. During a temporary communication loss, the NIU is not calibrated on the specified interval. Therefore, when communication is reestablished, the NIU may be unsatisfactorily calibrated such that the AIU must account for this. The figure below shows that many more downstream cells are transmitted for every upstream cell. The first downstream frame start cell is indicated by the shaded time slot. To the left of the downstream frame is an indication of which NIU is polled in the downstream frame start. Refer to the allocation of upstream time slots in the Example Upstream Time Slot Allocation in the Time Slot Allocation section of this document. The allocation of time slots in the allocation example is assumed in this example. Note that NIU #4 has not entered the network yet and, thus, its upstream transmit signal has not yet been calibrated. Thus, the polling response from NIU #4 is received on later time slots at the AIU than is allocated from NIU #4's polling response time slot. Also, note that the polling response by the NIUs are delayed by one upstream frame after the polling request is received. Furthermore, the upstream frame is received with an offset delay due to a constant path length difference between NTUs. So long as that difference is a constant, and does not vary between NIUs that may access the same upstream frame or frames, then this offset has no impact other than a delay.

TABLE 16

Example Polling Response Frame Delay

| Downstream | Upstream slot # | |
|---|---|---|
| [FS] Poll NIU #1 | 5 | NIU #3 [C] |
| | 6 | NIU #1 [C] |
| | 7 | NIU #3 [VC] |
| | 8 | NIU #2 [VC] |
| | 9 | NIU #3 [VC] |
| | 10 | NIU #3 [VC] |
| | 1 | [P] |
| | 2 | |
| | 3 | |
| | 4 | |
| [FS] Poll NIU #2 | 5 | |
| | 6 | |
| | 7 | NIU #3 [VC] |

TABLE 16-continued

Example Polling Response Frame Delay

| | | |
|---|---|---|
| | 8 | NIU #2 [VC] |
| | 9 | NIU #3 [VC] |
| | 10 | NIU #3 [VC] |
| | 1 | NIU #1 [P] |
| | 2 | |
| | 3 | |
| [FS] Poll NIU #3 | 1 | NIU #3 [C] |
| | 5 | |
| | 6 | NIU #2 [C] |
| | 7 | NIU #3 [VC] |
| | 8 | NIU #3 [VC] |
| | 9 | NIU #3 [VC] |
| | 10 | NIU #3 [VC] |
| | 1 | NIU #2 [P] |
| | 2 | |
| | 3 | |
| [FS] Poll NIU #1 | 1 | NIU #1 [C] |
| | 5 | |
| | 6 | NIU #2 [C] |
| | 7 | NIU #3 [VC] |
| | 8 | NIU #2 [VC] |
| | 9 | NIU #3 [VC] |
| | 10 | NIU #3 [VC] |
| | 1 | NIU #2 [P] |
| | 2 | |
| | 3 | |
| [FS] Poll NIU #1 | 1 | NIU #1, 2 [C] |
| | 5 | NIU #3 [C] |
| | 6 | NIU #1 [C] |
| | 7 | NIU #3 [VC] |
| | 8 | NIU #2 [VC] |
| | 9 | NIU #3 [VC] |
| | 10 | NIU #3 [VC] |
| | 1 | |
| | 2 | NIU #1 [P] |
| | 3 | |
| [FS] Poll NIU #2 | 1 | |
| | 5 | |
| | 6 | |
| | 7 | NIU #3 [VC] |
| | 8 | NIU #2 [VC] |

| status_request( ) | Bits | Bytes | Bit Number/Description |
|---|---|---|---|
| { | | | |
| } | | | |

| status_response( ) | Bits | Bytes | Bit Number/Description |
|---|---|---|---|
| { | | | |
| niu_tx_LO_offset | 8 | 1 | 1 kHz |
| niu_rx_LO_offset | 8 | 1 | 1 kHz |
| niu_tx_time_offset | 16 | 2 | .5 downstream modulation Symbol |
| niu_tx_power | 8 | 1 | .2 dBm below 0 dBm |
| niu_rx_power | 8 | 1 | 2 dBm below 0 dBm |
| } | | | |

| tx_calibration( ) | Bits | Bytes | Bit Number/Description |
|---|---|---|---|
| { | | | |
| freq_offset value | 8 | 1 | 1 kHz |
| time_offset_value | 16 | 2 | .5 downstream modulation symbol |
| power_offset_value | 8 | 1 | .2 dB |
| } | | | | status_request
This is for requesting status items from the NIU via the MAC protocol for status and control of the LDMS medium. Most other status is acquired via a VC for management.
status_response
The niu_tx_LO_offset is a signed integer with a resolution of 1 KHz where a positive value indicates that the LO for the transmitted signal is offset higher than the nominal LO value by this amount. This value includes any short loop, as well as, MAC controlled long loop corrections. The niu_rx_LO_offset is a signed integer with a resolution of 1 KHz where a positive value indicates that the LO for the received signal is offset higher than the nominal LO value by this amount. The niu_tx_time_offset is a signed integer with a resolution of a 0.5 downstream modulation symbol which equals 1 downstream sample clock period where a positive value indicates that the NIU is delaying its transmit, and a negative value indicates that the NIU is transmitting earlier than nominally expected. The niu_tx_power is a negative integer with a resolution of 2 tenths of a dB. The niu_rx_power is a negative integer with a resolution of 2 tenths of a dB.

tx_calibration

The offset values for the transmit signal from the NIU are sent in this message. The freq_offset_value is a signed integer with a resolution of 1 kHz where a positive value indicates that the NIU should increase its frequency, and a negative value indicates that the NIU should decrease its transmit frequency. The time_offset_value is a signed integer with a resolution of a 0.5 downstream modulation symbol with equals 1 downstream sample clock period where a positive value indicates that the NIU should delay its transmit, and a negative value indicates that the NIU should transmit sooner. The power_offset_value is a signed integer with a resolution of 2 tenths of a dB where a positive value indicates that the NIU should raise its power, and a negative value indicates that the NIU should lower it transmit power. In addition to these power offset values from the AIU, the NIU shall implement an automated transmit power correction algorithm based on the downstream received signal. Poll request do not need to be sent in order to determine the NIUs transmit signal offset values. This would be possible if the head-end is capable of determining timing, etc., adjustments from traffic time slots. Using a VC for the calibration message sent to the NIU wastes bandwidth since the information is small and infrequent enough such that it may be sent in the frame start.

4.3.7 NETWORK ENTRY

The AIU polls each of the NIUs on at least one of the downstream frequency channels in a group. Before the NIU enters the network, it may be polled on more than one downstream frequency channel from different channel groups, and a different niu_id may be used for each group. When the NIU attempts to enter the network, it acquires a downstream frequency channel and listens for the poll directed to it. Since the NIU has not entered the network, in order for the NIU to recognize that the poll is directed to it, the AIU sends the NIUs partial or full serial number along with the niu_id in the polling request message. One NIU may be polled more than once before another NIU is polled, so long as no other requirements are being violated. Since polls are not necessarily round robin, an NIU is not able to wait till the same niu_id comes around twice to in order to determine that it is not being polled on that downstream channel. Each NIUs transmit signal must be corrected on a regular basis, but a poll request type message is not necessary in order to send a transmit calibration message to the NIU. The transmit calibration message must be sent at least once every 2 seconds worst case. All NIUs that have not entered the network but are assigned to be polled on the downstream frequency will be polled on that downstream frequency channel no less frequent than 2 seconds. If the NIU waits 2 seconds, but does not receive its serial number, it will acquire the next downstream frequency and again listen for its serial number. This process repeats until the NIU finds a downstream frequency channel on which it is being polled. Once the NIU finds its poll and, then, responds to the poll, the NIU is only polled by this one downstream frequency channel.

So that the poll response time slot sent by the NIU does not interfere with adjacent upstream time slots during the initial polling handshakes, guard time slots may need to follow the NIU poll response time slot until the NIU transmit signal is sufficiently time aligned. Once again the NIU is calibrated, a connection for MAC control session is assigned and the security and configuration handshakes are executed. Once the NIU is configured, it goes into "Standby". "Standby" is characterized by lack of user activity. The AIU continues to poll the NIU while it is in "Standby" to maintain upstream transmit signal calibration.

| sign_on_request( ) | Bits | Bit Number/ Bytes | Description |
|---|---|---|---|
| { | | | |
| serial no. | | | |
| number_serial_no_bytes | 8 | 1 | |
| serial_no_bytes | | −20 | MS-byte first |
| upstream signal config | | | |
| symbol_rate_ratio | 8 | 1 | |
| upstream_frame_delay | 16 | 2 | Upstream time slots |
| synchronous_time_slot_delay | 8 | 1 | |
| num_pwr_retries | 8 | 1 | Number of retries before power |
| } | | | increase | sign_on_request

The sign_on_request has two parts, the serial_no, which indicates to the NIU that it is assigned to the downstream frequency channel that is transmitting this message, and the upstream_signal_config which is used by the NIU to configure it upstream transmitted signal. The num_ser_no_bytes field indicates the number of bytes in the serial_no, or least-significant bytes of the serial number, are in this message. The maximum number of bytes is 20. The symbol_rate_ratio is the ratio of downstream modulation symbols to upstream modulation symbols. Note that this is always an integer. This ratio is used by the NIU to set the upstream data rate. The upstream_frame_delay is the number of upstream time slots to delay the start of the upstream frame from receipt of the downstream frame start cell header. This shall be no less than 37 percent of the frame length. The synchronous_time_slot_delay indicates which upstream frame in which the NIU should start utilizing a synchronously allocated time slot such as polling response time slot. (See time_slot_allocation messages.) The start of the next upstream frame after the time slot message is received is frame number 1. The num_pwr_retries is the number of times that the NIU shall attempt to enter the network at the same power level before increasing the transmit power 3 dB.

4.3.8 SESSION CONNECTIONS

Session connections are ATM connections between NIU and AIU that transport communication between two control entities or servers. The control entities may or may not reside in the NIU and AIU. It may be necessary that the connection assigned by this session connection message be switched to other virtual connections one or more times to reach the control entity. In order to establish a session connection, it is not necessary that the NIU request a connection. The AIU may simply establish the connection by sending a session_connection message to the NIU. This is the case for control and management session connections. The MAC session connection is a control session and is known by default as VPI=0xFF, VCI=niu_id. The first session connection that is established is typically for the MAC session and is the MAC connection for transporting MAC messages in the downstream random access time slots and in the upstream reserved time slots. These time slots are referenced in this document by VC (Virtual Connection). Since the MAC session is the first session for which a connection is established, the niu_session_id is usually 0 for that connection. A management session connection is usually established next. The user data, video, and voice session connections are typically requested by the NIU when the STU requires a connection to transport control messages to a control entity or server at the AIU or beyond. If the session connection is for transporting ATM user data control messages, then the entity would be Q.2931 entity. The STU would detect idle cells from an external ATM port and then invoke the NIU to request a session connection for anticipated Q.2931 messages. Due to the shared wireless physical media, assigning a different MAC session connection for each NIU alleviates the need for every NIU to process every MAC session connection cell to identify which cell payloads contain its niu_id. Furthermore, for other session connections, e.g., management and user data Q.2931, it is necessary that there be a different session connection so that these messages may be simply passed through to the NIU without appending an niu_id. If every NIU used 0/5 for Q.2931, there would be no way to tell to which NIU the Q.2931 messages were sent.

All session connection messages require an acknowledgment via the session msg_ack message. A session msg_ack message sent by an AIU to an NIU, or by an NIU to an AIU, must be completely received by the NIU, or AIU, within 10 seconds from the time that the session message is sent by the NIU, or AIU. Any session message sent by the NIU or AIU that does not receive acknowledgment within the specified time shall immediately be resent. As long as the acknowledgment is not received, the session message shall be resent a minimum of 5 times. If the message becomes invalid during this process, the NIU and AIU shall complete this process with the original message before changing the session message sent.

| session_request( ) | Bits | Bytes | Bit Number/Description |
|---|---|---|---|
| { | | | |
| niu_session_id | 32 | 4 | |
| session_type | 8 | 1 | 0 = MANAGEMENT |
| | | | 1 = MAC CONTROL |
| | | | 2 = USER_DATA |
| | | | 3 = USER VIDEO |
| | | | 4 = USER VOICE |
| | | | 5–255 = reserved |
| reserved | 8 | | Bits 2–7 Unused |
| downstream_direction | 1 | | Bit 1 |
| upstream direction | 1 | | Bit 0 |
| } | | | |

| session_connection( ) | Bits | Bytes | Bit Number/Description |
|---|---|---|---|
| { | | | |
| niu_session_id | 32 | 4 | |
| session_type | 8 | 1 | 0 = MANAGEMENT |
| | | | 1 = MAC CONTROL |
| | | | 2 = USER_DATA |
| | | | 3 = USER VIDEO |
| | | | 4 = USER VOICE |
| | | | 5–255 = reserved |
| Downstream | | | |
| VPI | 8 | 1 | VPI/VCI = 0.0 indicates |
| VCI | 16 | 2 | no assignment |
| Upstream | | | |
| VPI | 8 | 1 | VPI/VCU = 0.0 indicates |
| VCI | 16 | 2 | no assignment |
| } | | | |

| Session_release ( ) | Bits | Bytes | Bit Number/Description |
|---|---|---|---|
| { | | | |
| niu_session_id | 32 | 4 | |
| } | | | |

| Session_msg_ack ( ) | Bits | Bytes | Bit Number/Description |
|---|---|---|---|
| { | | | |
| niu_session_id | 32 | 4 | |
| } | | | | session_request

A session_request message is to set-up a connection to a server or entity that can provide the control flow for that type of session. If a signaling connection for a type of session, e.g., data session, has been connected, then subsequent signaling messages and connection data do not require a session_request message and handshake. The niu_session_id is a unique number for that session for the one NIU designated by the niu_id in the message header. The session_type indicates to the AIU to which server or entity at the head-end-service provider that the session control connection should be made. The session connection can be uni-directional to support uni-directional services, e.g., broadcast video or bi-directional to support bi-directional services., e.g. data. To request a bi-directional connection, set both the downstream and upstream bits. Otherwise, set either the upstream or downstream bit to indicated the direction of the requested uni-directional connection.

session_connection

The session_connection specifies the VC. i.e., VPI/VCI, that the NIU must use for the requested session connection. The session_connection can be uni-directional to support uni-direction services, e.g., broadcast video. The downstream VPI and downstream VCI are the VPI/VCI for use in the downstream direction. The upstream VPI and upstream VCI are the VPI/VCI for use in the upstream direction. For a bi-directional connection the upstream and downstream VPI/VCI may be the same but are not required to be. In the case of uni-directional connection, the reverse direction is null as indicated by VPI/VCI=0.0 in that direction. A different control connection for signaling may be assigned for each port of the STU for support of simultaneous signaling control flows from the same STU. The session_type indicates to the AIU to which server or entity the session control connection should be made.

session_release

The session control connection is disconnected after it is no longer needed by the STU or can not longer be supported by the AIU. Session_release originates from either the AIU or the NIU/STB.

session_msg_ack

To ensure that session is provided within a reasonable or necessary time, as determined by the type of session, the session_msg_ack is sent in response to each of the session messages.

4.3.9 SECTOR LOAD BALANCE

| new_downstream_channel ( ) | Bits | Bytes | Bit Number/Description |
|---|---|---|---|
| { | | | |
| downstream_frequency | 16 | 2 | 5 MHz at the IF |

```
                                   frequency
channel_bandwidth         8    1   5 MHz units
bits_per_symbol           8    1   Modulation bps per Hz
                                   QPSK = 2
                                   16 QAM = 4
convolutional_encode rate 8    1   Convolutional encode
                                   rate
                                   0 = Rate ½
                                   1 = Rate ⅔
                                   2 = Rate ¾
                                   3 = Rate ⅚
                                   4 = Rate ⅞
                                   5–7 = Reserved
}
``` new_downstream_channel

This message may be used to tell the NIU to reacquire on a downstream_channel other than the one it has currently acquired. The NIU initially acquires the lowest QPSK channel, listens for its poll, goes to the next QPSK channel that it can acquire, and listens there for its poll, etc. until its poll is found. The AIU may then use this message to move the NIU to a downstream_channel with different modulation and FEC parameters to take advantage of the enhanced capabilities or advantaged propagation environment of the NIU. The downstream_frequency is the new frequency in 5 MHz steps at the NIU input. The channel_bandwidth field specifies whether the channel is a 20 MHz or 40 MHz channel. The bits_per_symbol field is used to specify the modulation parameters of the new channel to enable the NIU to use higher order modulation such as 16 QAM. The convolutional_encode_rate field specifies the amount of convolutional encoding that the new frequency channel will employ. It is an enumerated value that represents the rate as shown in the above table.

4.3.10 CONTENTION SLOT FEEDBACK

```
contention_slot_feedback( )   Bits  Bytes  Bit Number/Description

{
upstream_frequency            16    2      100 kHz IF frequency
number_time_slots             16    2
for (each contention                 n     Fill bytes starting with
time slot)                                 MSB
{
contention_slot_status        2            0 = idle
                                           1 = receipt (nocollision)
                                           2 = collision
                                           3 = reserved
    }
}
``` contention_slot_feedback

The contention_slot_feedback message is used by the AIU to send feedback to the NIU for contention time slot reuse algorithm stabilization. For every allocated contention_time_slot in the upstream channels for a given downstream channel, the contention_slot_feedback message shall be sent on every time frame start to give status of the last completely received upstream frame. The information is given for each contention time slot starting from the lowest numbered time slot in the upstream frame. The upstream_frequency designates the upstream at the NIU IF output in 100 kHz steps. The num_time_slots is the number of time slots that are in the following list for the upstream frequency. The contention_slot_status list begins with the MS 2-bits of the byte following the num_time_slots field. Four contention_slot_status fields are packed into this and each additional byte. If more than four contention_time_ slots are allocated for the upstream frequency, then the fifth status is in the MS 2-bits of the next byte., etc. The 2-bits can indicate either idle, receipt, or collision, with a fourth reserved indication. Idle indicates that no NIU transmitted on the contention_time_slot. Receipt indicates that only one NIU transmitted on the contention_time_slot, and thus, the contents have been successfully received at the AIU. Collision indicates that two or more NIU transmitted on the contention_time_slot, and thus, since a collision occurred, none of the transmissions on the time slot have been successfully received at the AIU.

4.4 LAN FUNCTIONALITY

In this model, the End Station (E.S.) employs a shared media interface such as Ethernet. The session entity within the STU includes a SAR function and an 802 MAC level bridge function which communicates with a LAN Emulation Client entity (LEC) located in the network. This LEC is compliant with ATM-Forum LANE standards. It is assumed that remote End Stations contain the required LANE servers and peer clients.

Understand that the internal operation of the E.S. is representative of typical operation. It is informative and provided to facilitate understanding of the normative portions.

TABLE 17

Shared Media Initializatian Session & Call/Connectian Establishment

| | |
|---|---|
| 1a–1b | The E.S. Peer application sends the first IP packet. The underlying stack on the E.S. Sends an ARP packet to resolve the destination IP address to an 802 MAC address. The Bridge function in the STU session receives this request and triggers initialization with LEC in network. |
| 2a–2g | Bridge function establishes an SVC connection to LEC in network. |
| 3a–3b | Bridge in STU and LEC in network communicate to resolve 802 NAC addresses. (See Note 1.) |
| 4a–4b | The LEC supplies an ARP response message to the bridge which forwards it to the E.S. This message includes the requested 802 MAC address. |
| 5a–5b | The first IP packet(s) from E.S. Application flow to the bridge and then via the existing connection (labeled 3a–3b) to the LEC where 802 MAC address is translated to ATM address of distant end LEC. The LEC directs the bridge to establish a direct ATM connection between the bridge (SAR) and a distant LEC. At the same time the LEC may request additional information from LANE servers and may forward initial packets to LEBUS. |
| 6a–6f | The bridge requests and establishes a connection to the distant LEC. |
| 7a–7b | IP packets flow bi-directionally from E.S. Through bridge to destination LEC. |

Note 1: The protocol between bridge and LEC is to be defined. Not also that the LEC may need to communicate with LANE servers. These may be co-located or require their own connections. This is defined by ATM Forum and considered outside the scope of this Section.

4.5 HARDWARE AND SOFTWARE IMPLEMENTATIONS 4.5.1 USER EQUIPMENT

FIG. 18 shows the block diagram for the subscriber equipment which implements the wireless network protocol. An RF transceiver (1) interfaces with the antenna and performs signal amplification, downconversion from RF to baseband, and the gain control to provide proper levels into the analog to digital (A/D) converter (2). The digital demodulator (3) recovers the carrier and symbol timing of input signal and passes soft-decision demodulated data to the forward error correction decoder (4). The digital demodulator recovers the input signal symbol timing by controlling the phase of the A/D converter sample clock via a data transition tracking loop fed back to a voltage-controlled oscillator (not shown for clarity). The digital demodulator also controls the gain in the downconverter stage of the RF transceiver via a gain control voltage. The forward error correction decoder convolutional decoding via the Viterbi algorithm and Reed-Solomon decoding and passes recovered ATM cells to the transmission convergence transceiver (5). The transmission convergence transceiver detects the frame start ATM cell and counts time slots within the frame to filter out ATM cells which are not intended for the user. ATM cells intended for the user are passed to the segmentation and reassembly (SAR) device (6) which constructs higher level packets to be passed to the data interfaces. In-band ATM signaling cells directly to the central processing unit (7) which interprets the commands.

In the transmit direction, the central processing unit maintains a time slot map which is loaded into the transmission convergence transceiver. As higher level packets from the data interfaces are segmented into ATM cells, the transmission convergence transceiver loads them into the prescribed time slots of the upstream frame. In-band signaling cells, either session requests or responses to polling are passed from the central processing unit to the segmentation and reassembly device for insertion into the upstream frame.

Alternately, the transmission convergence transceiver can recognize and direct in-band signaling ATM cells to and from the central processing unit and bypass the SAR device. This would enable a physical layer only interface between the user equipment and other user premises equipment, since the SAR would not be performing segmentation and reassembly. Ultimately, the transmission convergence transceiver and the SAR may be combined into a single device.

ATM cells packaged onto the upstream frame are passed to the forward error correction encoder (8) which then sends the serial system to the modulator (9) for modulation onto a carrier. The symbol timing of the modulator is coherently referred to the recovered receive symbol timing via a frequency synthesizer or numerically controlled oscillator (NCO) (10). The symbol timing can be adjusted to ensure time slot alignment by a clock swallower circuit (11) or other means. The modulated signal is then frequency converted to the desired RF frequency by the RF transceiver. The output power level is controlled by the CPU from measurements of received power level from the AGC feedback from the digital demodulator to the RF transceiver and from the bit error rate estimator in the forward error correction device.

4.5.2 BASE STATION EQUIPMENT

FIG. 19 shows the block diagram for the base station equipment. An RF transceiver (1) interfaces with the antenna and performs signal amplification, downconversion from RF to baseband, and the gain control provide proper levels into the analog to digital (A-D) converter (2). The digital demodulator (3) recovers the carrier and symbol timing of input signal and passes soft-decision demodulated data to the forward error correction decoder (4). The forward error correction decoder performs convolutional decoding via the Viterbi algorithm and Reed-Solomon decoding and passes recovered ATM cells to the ATM switch (5). The ATM switch may be implemented as a segmentation and reassembly ASIC, or as an external piece of equipment. In-band ATM signaling are passed directly to the central processing unit (6) which interprets the requests and polling responses.

When the base station polls a user for status and health, it will read the user's timing offset from the timing offset counter (7), and the user's frequency offset and signal level from the digital demodulator. Corrections to these are assembled into an in-band ATM cell and passed to the ATM switch for insertion into the downstream frame. Time slots in the downstream frames are filled with cells by the ATM switch according to typical scheduling functions of switches with the exception that the ATM switch inserts the time start cell received from the central processing unit and exact intervals. The ATM cells are then forward error correction encoded (8) and modulated (9) to form the downstream RF. The RF transceiver upconverts the downstream signals to radio frequency. The central processing unit adjusts the transmit power level according to bit error rate measurements fed back from the subscriber to the hub station in the upstream network management polling response ATM cells.

5. MODIFICATIONS

While the invention has been described in connection with the preferred embodiments, it will be appreciated that modifications, adaptations and variations will be obvious to one skilled in the art as reflected in the following examples:

The following variations should be obvious to the trained observer and are also claimed:
1. Use of alternate data rates resulting in a different number of time slots per frame.
2. Use of means other than ATM switch for routing in-band signaling ATM cells to the CPU in the base station.
3. Use of means other than SAR device for routing in band signaling ATM cells to the CPU in the user equipment.
4. Location of the contention cells and polling response cells within the upstream frame. Depending on processing capability, it may be advantageous to place the polling response time slot in the middle of the upstream frame, so that the subscriber can respond within the same frame period.
5. Use of alternate circuits for adjusting the user transmit time slot timing with respect to implementing a network protocol for wireless broadband-ISDN. Use of alternate circuits for unrelated applications is not claimed.
6. Other measures of received power level by the user equipment such as monitoring AGC settings, bit error rates prior to forward error correction decoding, etc.

What is claimed is:

1. A system for the delivery of wireless broadband integrated services digital network (ISDN) using asynchronous transfer mode (ATM), there being at least one base station and multiple user stations, comprising:

said at least one base station has time division multiplexing (TDM) means for transmissions from said base station to said user stations, each of said user station includes means for communication with said base station on a time division multiple access (TDMA) basis, control means for controlling access and actively assigning time slots to said user stations for access in said TMDA system, said base station having frame timing signal means and each said user station having user frame timing means and means to synchronize said user frame time slot timing means with said base station frame timing signal means, each frame having time slots therein with each time slot carrying individual asynchronous transfer mode (ATM) cells and wherein the first time slot of frame timing signals from said base station includes a frame start ATM cell, means at said user stations for maintaining said frame time slot synchronization to within plus or minus (±) two modulation symbols, and wherein certain ones of said time slots in the frame from said base station to said user include random access time slots which are used for control plane requests by users entering the network and users in standby mode seeking to begin a session, and polling is used for management plane functions and responses by users on a polling response time slot.

2. A method for the delivery of wireless broadband integrated services digital network (ISDN) using asynchronous transfer mode (ATM) between a stationary base station and multiple stationary user stations, each stationary user station having a high gain directional antenna, comprising:

time division multiplexing (TDM) on an ATM cell basis in the direction of the base station to user with frame time slots, providing time division multiple access (TDMA) on an ATM cell basis in the direction from the user stations to the base station, synchronizing transmissions from the user stations to the base stations by synchronizing the user stations to the base station frame timing where the frame time slot of the base station carries a frame start ATM cell, wherein the frame time slot synchronization is maintained within plus or minus two modulation symbols, and providing time periods in both signal transmission from the base station to the user stations and from the user stations to the base station which are approximately but not greater than 6 milliseconds in length to allow delivery of voice traffic with minimum latency.

3. A networking protocol for wireless base station to a plurality of stationary user stations with each stationary user stations utilizing high gain directional antennas comprising:

means for establishing transmission convergence layer provided through:

a) time-division multiplexing is performed on an ATM cell basis in the direction of the base station to the user stations (downstream direction);

b) time-division multiple access on an ATM cell basis is used in the direction of the user to the base station (upstream direction);

c) upstream frame timing is synchronized to the downstream frame timing, where the first time slot of the downstream frame carries a Frame Start service data unit which is an ATM Adaptation Layer 5PDU identified by a unique reserved VPI/VCI of 0xFF/0xFFFF;

d) frame periods in both the upstream and downstream directions are approximately but not greater than six milliseconds in length to allow delivery of voice traffic with minimum latency;

means for establishing physical medium dependent layer where:

a) the downstream is continuous-carrier with α=0.20 root-raised cosine filtering, with QPSK or alternately 16 QAM or 65 QAM modulation, using concatenated forward error correction coding consisting of a (204,188, t=8) Reed-Solomon over GF(256).

b) the upstream is burst-mode with α=0.30 root raised cosine filtering, with QPSK or alternately 16 QAM modulation, using forward error correction of a (68, 53,t=5) Reed-Solomon code over GF(256), c) time slots in the upstream direction have four preamble bytes, one ATM cell with 10 bytes of Reed Solomon overhead, and a one byte guard time;

means for providing medium access control functions is provided through:

a) in-band signaling through ATM cells with reserved VPI/VCIs so that the requirements for acquisition, demodulation, and forward error correction are uniform across the data, control, and management planes of the network protocol;

b) transmission convergence layer medium access control which dynamically assigns time slots in the upstream direction to accommodate varying demands for bandwidth by multiple users;

c) contiguous time slots in the upstream frame are used for entry into the network by users whose two-way range timing has not been resolved to avoid mutual interference, where users entering the network remain on the net entry time slots until their timing is aligned;

d) session requests are performed on a contention basis through contention time slots;

e) single cell available bit rate (ABR) service data units (SDUs) can be sent on contention time slots in the upstream direction with acknowledgement coming from the base station in the downstream frame start PDU;

f) contention acknowledgement is sent on the downstream frame to perform stabilization of the retransmission probabilities to avoid collisions becoming severe;

g) control plane acknowledgements of service requests and time slots reservations are made in the payload of the frame start PDU in the downstream frame;

means for providing management plane functions are provided through:

a) in-band signaling through ATM cells with reserved VPI/VCIs so that the requirements for acquisition, demodulation, and forward error correction are uniform across the data, control, and management planes of the network protocol;

b) polling users by the base station for status, power, frequency, and timing control, with users responding on dedicated time slots in the upstream frame;

c) carrying management plane polling requests in the payload of the frame start pdu IN THE DOWNSTREAM FRAME CARRIES;

d) upstream time slot synchronization is maintained to within ±0.5 modulation symbols through timing control from the base station to the user and through slaving the user transmit symbol clock to its received symbol clock in the transmission convergence layer;

e) upstream power control is employed to ensure adequate received signal strength at the base station while minimizing adjacent cell interference.

4. The networking protocol defined in claim 3 wherein said base station includes:

a) means for routing of in-band signaling ATM cells by the ATM switching device to and from the central processing unit;

b) means for measuring timing offsets by subscribers through counting periods of the reference symbol clock from a master frame epoch to the detection of the Barker sequence of the received transmission from the user;

c) means for measuring received signal level via bit error rate estimation for closed loop power control of the user transmitter.

5. The networking protocol defined in claim 3 wherein each station includes:
 a) means for routing in-band signaling ATM cells to and from the ATM switching or segmentation and reassembly device to the user equipment central processing unit;
 b) means for adjusting transmitter power based on received power level and power control commands via in-band signaling ATM cells from the base station;
 c) means for slaving the transmit symbol clock reference to the received symbol clock reference;
 d) means for adjusting the transmit symbol clock timing to minimize interference to other users.

* * * * *